United States Patent
Bonel et al.

(10) Patent No.: US 10,435,865 B2
(45) Date of Patent: Oct. 8, 2019

(54) TRENCHING ASSEMBLY FOR LAYING IN A TRENCH A CONTINUOUS PIPELINE AND TRENCHING METHOD

(71) Applicant: SAIPEM S.P.A., San Donato Milanese, Milan (IT)

(72) Inventors: Paolo Bonel, Milan (IT); Diego Lazzarin, Milan (IT); Alberto Serena, Milan (IT)

(73) Assignee: SAIPEM S.P.A., San Donato Milanese, Milan (IT)

( * ) Notice: Subject to any disclaimer, the term of this patent is extended or adjusted under 35 U.S.C. 154(b) by 0 days.

(21) Appl. No.: 15/748,114

(22) PCT Filed: Jul. 26, 2016

(86) PCT No.: PCT/IB2016/054437
§ 371 (c)(1),
(2) Date: Jan. 26, 2018

(87) PCT Pub. No.: WO2017/017599
PCT Pub. Date: Feb. 2, 2017

(65) Prior Publication Data
US 2018/0216314 A1    Aug. 2, 2018

(30) Foreign Application Priority Data
Jul. 28, 2015 (IT) .................. 102015000039007

(51) Int. Cl.
*E02F 5/10*  (2006.01)
*F16L 1/16*  (2006.01)
*E02F 5/14*  (2006.01)

(52) U.S. Cl.
CPC .............. *E02F 5/105* (2013.01); *E02F 5/104* (2013.01); *E02F 5/145* (2013.01); *E02F 5/106* (2013.01);
(Continued)

(58) Field of Classification Search
CPC . E02F 5/104; E02F 5/105; E02F 5/106; E02F 5/107; E02F 5/109; F16L 1/16
(Continued)

(56) References Cited

U.S. PATENT DOCUMENTS 5,722,793 A * 3/1998 Peterson ................. B63B 35/06
405/158
6,658,767 B2   12/2003 Kelly et al.
(Continued)

FOREIGN PATENT DOCUMENTS

EP    0 452 021 A1   10/1991
EP    1 167 636 B1    7/2004
(Continued)

OTHER PUBLICATIONS

International Search Report and Written Opinion of the International Searching Authority for corresponding International Patent Application No. PCT/IB2016/054437 dated Oct. 24, 2016, 12 pages.
Melcher, P., "A mathematical model for the simulation of the trafficability of mobil deep-sea mining vehicles", Robotersysteme, 4(4): 210-222 (1988), English Abstract.

*Primary Examiner* — Frederick L Lagman
(74) *Attorney, Agent, or Firm* — Merchant & Gould P.C.

(57) ABSTRACT

A trenching assembly lays a continuous pipeline in a trench dug in a bed with uneven bathymetry, the trenching assembly including a trench digging device having a main body; at least four ground contact units, each unit having a height adjustment device, to position each ground contact unit with respect to the main body independently. A trench cutting tool digs in the bed includes a cutting depth adjustment device, for positioning the cutting tool with respect to the main body. A detection device detects bed bathymetry. A control device simultaneously allows cooperation between the detection device, the height adjustment device of each ground contact unit, and the cutting depth adjustment
(Continued)

device. A command device cooperates with the control device to adjustment each ground contact unit and the cutting depth adjustment device, to obtain a trench having a height difference lower than a predefined tolerance and a predetermined burial depth.

20 Claims, 14 Drawing Sheets

(52) U.S. Cl.
CPC ............... *E02F 5/107* (2013.01); *E02F 5/108* (2013.01); *E02F 5/109* (2013.01); *F16L 1/16* (2013.01)

(58) Field of Classification Search
USPC .................................................. 405/159, 160
See application file for complete search history.

(56) References Cited

U.S. PATENT DOCUMENTS

| | | | |
|---|---|---|---|
| 8,834,068 B2 * | 9/2014 | Lazzarin | ................. E02F 5/006 405/158 |
| 2012/0288334 A1 * | 11/2012 | Bellin | .................... B63B 35/03 405/160 |

FOREIGN PATENT DOCUMENTS

| | | |
|---|---|---|
| EP | 1 985 766 A2 | 10/2008 |
| JP | 5565964 B2 | 8/2014 |
| WO | 2011/061605 A1 | 5/2011 |
| WO | 2012/008829 A1 | 1/2012 |
| WO | 2013/061075 A1 | 5/2013 |
| WO | 2013/167910 A1 | 11/2013 |

* cited by examiner

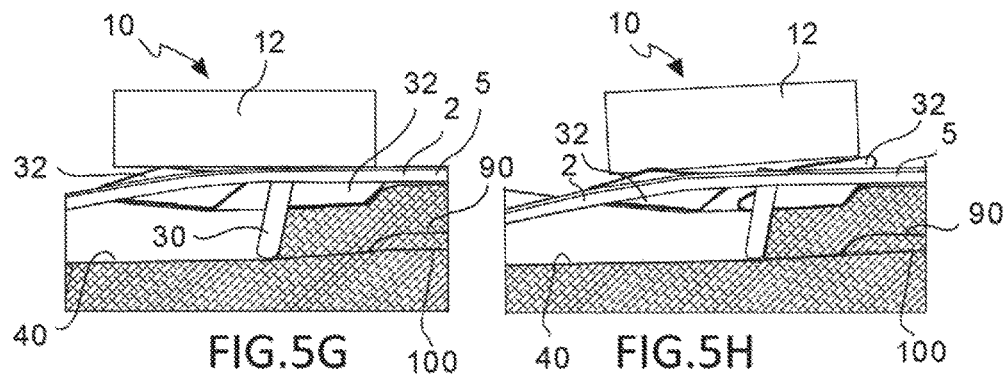
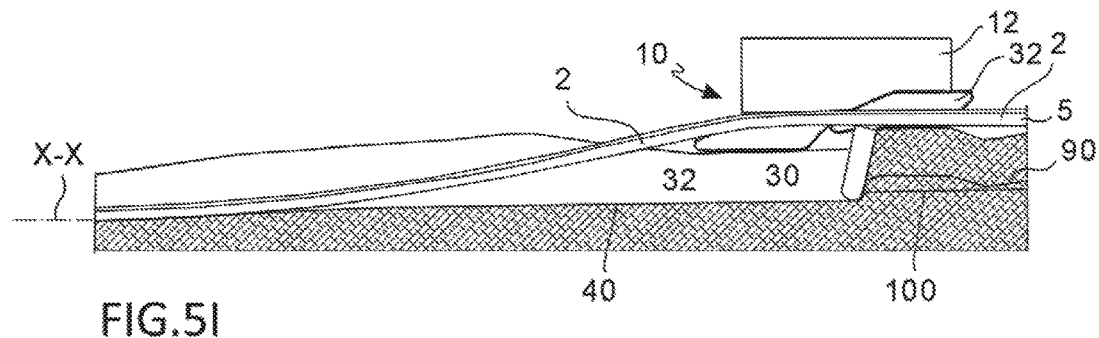
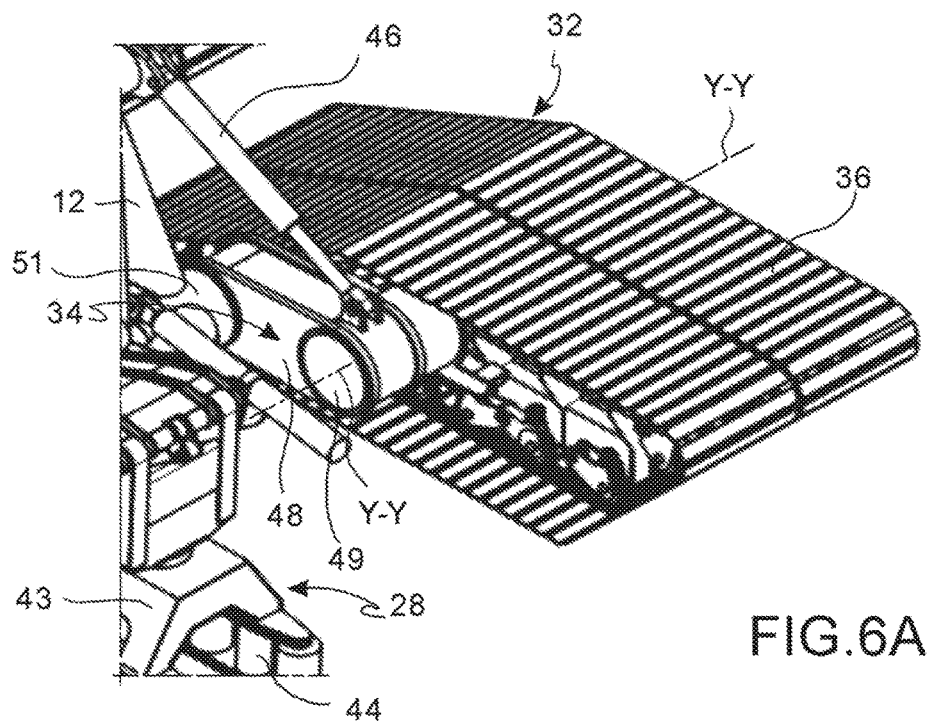

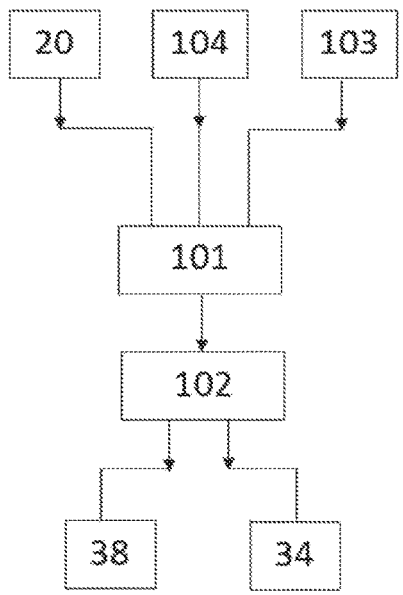
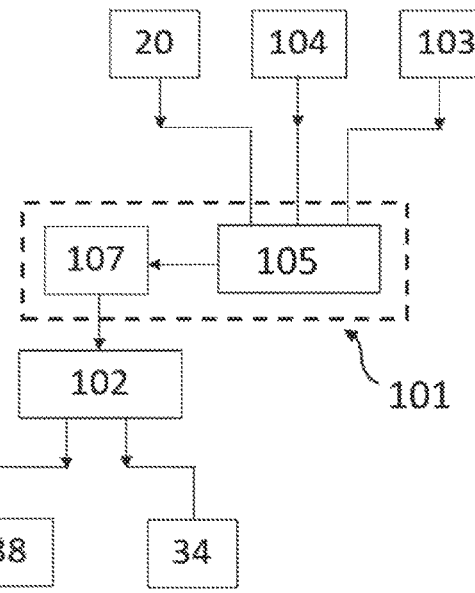
FIG.11A    FIG.11B
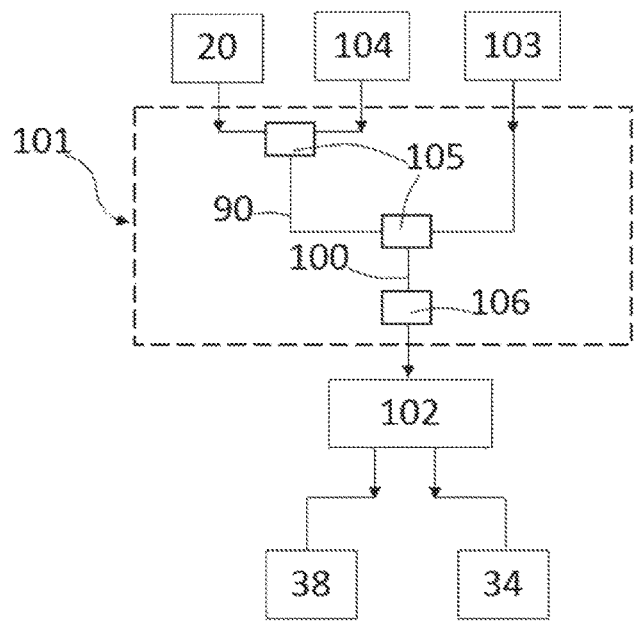
FIG.11C

TRENCHING ASSEMBLY FOR LAYING IN A TRENCH A CONTINUOUS PIPELINE AND TRENCHING METHOD

This application is a National Stage Application of PCT/IB2016/054437, filed 26 Jul. 2016, which claims benefit of Serial No. 102015000039007, filed 28 Jul. 2015, and which applications are incorporated herein by reference. To the extent appropriate, a claim of priority is made to each of the above disclosed applications.

FIELD OF THE INVENTION

The present invention refers to a trenching assembly for laying in a trench at least one portion of a continuous pipeline, as well as to a method for laying in a trench a continuous pipeline.

In particular, the present invention refers to an assembly as well as to a method for laying in a trench dug in the earth of an irregular and uneven bed at least one portion of a continuous submerged pipeline.

The term "continuous pipeline" is meant to indicate a structure that extend predominantly along an axial, or longitudinal direction, and is for example a portion, or section, of a pipe for transporting fluid, like for example gas and/or petroleum and/or other hydrocarbons, or a section of a pipe for transporting water. Said continuous pipeline can comprise joining elements suitable for example for connecting adjacent pieces of continuous pipeline. Said continuous pipeline is suitable for providing a passing flow inside it, and said flow is for example a flow of a liquid or gaseous fluid. Said continuous pipeline is submerged, suitable for being laid in a trench dug in a bed of an ocean, sea or lake, and said bed is a bed having irregular or uneven bathymetry.

The term "bathymetry of the bed" is meant to indicate the configuration of the bed, which can be recorded in electronic format. The term "information on the bathymetry" is meant to comprise at least one signal comprising bathymetry data.

Making trenches makes it possible to lay a continuous pipeline so as to protect it from risks of impact and mechanical stresses to which a continuous pipeline simply rested on the bed can be subjected, like for example piercing with anchors, the fall of heavy objects, or the thrusting effect caused by marine weather forcers as well as by thermal dilations.

STATE OF THE ART

Generally, in order to lay a continuous pipeline underwater vehicles are used that are equipped with wheels, skates or tracks that rest on the bed and move forward on the floor of the bed, wherein thanks to the provision of a digging tool, said vehicles are suitable for digging an underwater trench. Solutions of this type are known for example from documents U.S. Pat. No. 6,658,767B2 and EP1985766A2.

Underwater trenches can be obtained through "pre-trenching", i.e. digging a trench before laying the continuous pipeline, or "post-trenching", i.e. digging a trench after the laying of the continuous pipeline, suitable for laying preferably rigid pipes, i.e. having a relatively high flexional rigidity. Vehicles suitable for performing "post-trenching" comprise, in some cases, a hooking device, suitable for keeping said continuous pipeline raised from the bed while the digging tool makes the trench. Moreover, the digging tool can for example comprise a milling group as well as cutting depth adjustment devices that can cooperate with an electronic system for compensating for digging errors, which for example controls the digging parameters, measuring the position occupied by the continuous pipeline when hooked in said hooking device. For example, when the continuous pipeline hooked in said hooking device rises beyond a certain threshold, the compensation system actuates a device for lowering the digging tool to make a deeper trench. The pipeline can be raised exclusively due to the irregularity of the terrain.

Moreover, for example from documents WO2013/061075A1, WO2013/167910A1 and EP1167636B1, vehicles are known that are equipped with wheels or tracks that can be independently height-adjusted, which make the vehicle suitable for digging a trench on a bed that has an inclined or irregular slope.

However, when the bed is a bed having irregular or uneven bathymetry, i.e. it comprises for example valleys, peaks or protruding rocky formations, or sandy or clay yielding portions, the digging of trenches by means of known tools can be ineffective, because the vehicle that digs the trench may not be able to move on the highly irregular bed, or tends to reproduce the profile of the bed on the bottom of the trench, thus making a trench with an irregular trench bottom characterized by frequent dips and rises.

The continuous pipeline to be buried thus rests on projecting portions of the trench bottom and due to its rigidity, a portion thereof at the valleys of the trench bottom remains suspended between successive resting points. This means that the continuous pipeline cannot be buried satisfactorily in its suspended portions at the valleys of the trench bottom. Moreover, in the conditions described above, the continuous pipeline can undergo excessive deformations, for example due to its own weight, the weight of the fluid flowing inside it or due to the load of material with which it is buried. Such deformations can generate localized bending of the pipeline and said localized bending can cause the pipeline configuration to go outside the geometric tolerance limits, or shape tolerance, required by the properties of the material that makes up the pipeline itself to ensure the integrity thereof, when the continuous pipeline is in operating conditions. Indeed, it is known that in the areas close to the localized bending of this type there is a concentration of stresses and tensions.

Moreover, a vehicle, suitable for laying a continuous pipeline, which moves on an irregular bed can become damaged, particularly when the irregularities of the bed cannot be predicted with sufficient warning. For example, a vehicle that moves on an irregular bed can strike against fixed or mobile underwater obstacles, as well as can lose grip on sandy portions of bed or in the presence of yielding portions or unforeseen holes. A vehicle suitable for digging underwater trenches is generally connected through a supply cable to a support ship that provides the energy required at least for digging the trench and moving said vehicle.

On a support ship a detection device of the bathymetry of the bed can be mounted. For example, document JP5565964B2 shows a three-dimensional detection sonar for detecting the bathymetry of the bed mounted on a ship that cooperates with a vehicle for levelling and flattening beds with irregular bathymetry.

However, solutions of this type, although partially advantageous, are undesirable, and indeed levelling or flattening the bed having irregular bathymetry is an extremely invasive solution as well as being costly both economically and to the environment.

Document WO2011/061605A1, to the same Applicant, discloses a method for laying a continuous pipeline on an underwater bed that foresees the step of providing a laying ship with a detection device of the bathymetry of the bed. However, the solution proposed in such a document does not fully solve the problem since it does not provide any laying strategy of the continuous pipeline in the case in which the bed has a highly irregular and uneven bathymetry.

Therefore, there is a need to bury in an underwater trench a continuous pipeline by a predetermined amount and at the same time ensure that said linear structure has a height difference lower than a predefined tolerance, to avoid the occurrence of localized bending and to avoid flattening the bed, as well as of avoiding damage to the vehicle moving on an irregular bed.

SOLUTION

A purpose of the present invention is to avoid the drawbacks of the prior art and provide a solution to the need to provide an assembly as well as a method for burying a continuous pipeline at a predefined depth, ensuring that said continuous pipeline has a height difference lower than a predefined tolerance.

Thanks to the provision of a trenching assembly comprising a trench digging device suitable for cooperating at least with a detection device, suitable for acquiring information on the bathymetry of the bed, and with at least one control device, it is possible to obtain a trench in a precise manner even in bed portions having irregular and uneven bathymetry, ensuring that the continuous pipeline has a certain burial depth in said trench and a longitudinal height difference lower than a predefined amount, without needing to level or flatten the bed.

Thanks to the provision of a trenching assembly comprising at least one control device and at least one command device, which cooperate with said detection device it is possible to precisely adjust the trench digging parameters and the advancing parameters of the trench digging device, as a function of the information on the bathymetry of the bed. Thanks to the provision of cutting depth adjustment devices and height adjustment devices of the ground contact units of said trench digging device, suitable for cooperating with said control device and said command device, it is possible to optimize the digging and advancing performance based on information on the bathymetry of the bed.

Thanks to the provision of a detection device suitable for detecting the bathymetry of the bed, at the same time as the digging operations, in bed portions having irregular and/or uneven bathymetry on which the trench has not yet been dug, it is possible to carry out a predictive control of the digging and advancing parameters.

FIGURES

Further characteristics and advantages of the assembly and of the method will become clearer from the following description of preferred embodiments thereof, given for indicating and not limiting purposes, with reference to the attached figures, in which:

FIGS. 1 to 4 are vertical top views that schematically indicate—not to scale—a trenching assembly in accordance with some embodiments of the invention (it should be noted that said FIGS. 1-4 are deliberately made not to scale in order to illustrate a single image of various parts of a trenching assembly according to some embodiments of the invention; indeed for example in one embodiment the dimensions of the ship are much greater than the dimensions of a digging device);

FIGS. 5A-I are schematized section views that illustrate some steps of a laying method in accordance with a possible way of operating;

FIG. 6A is a perspective view that illustrates an enlargement of a portion of a trench digging device;

Figure 1:
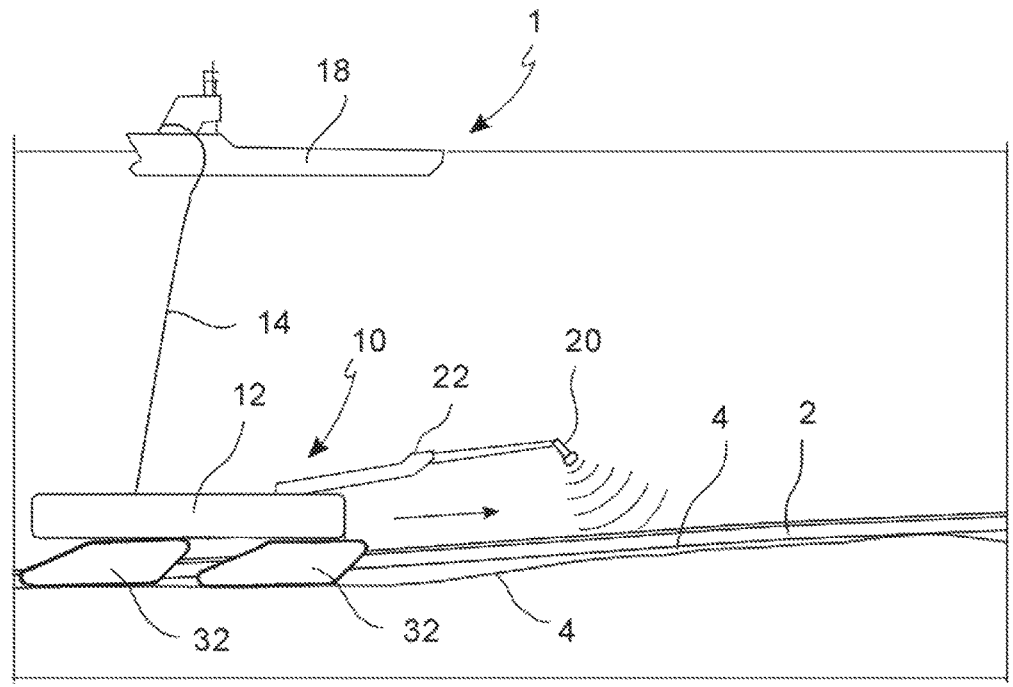
Figure 2:
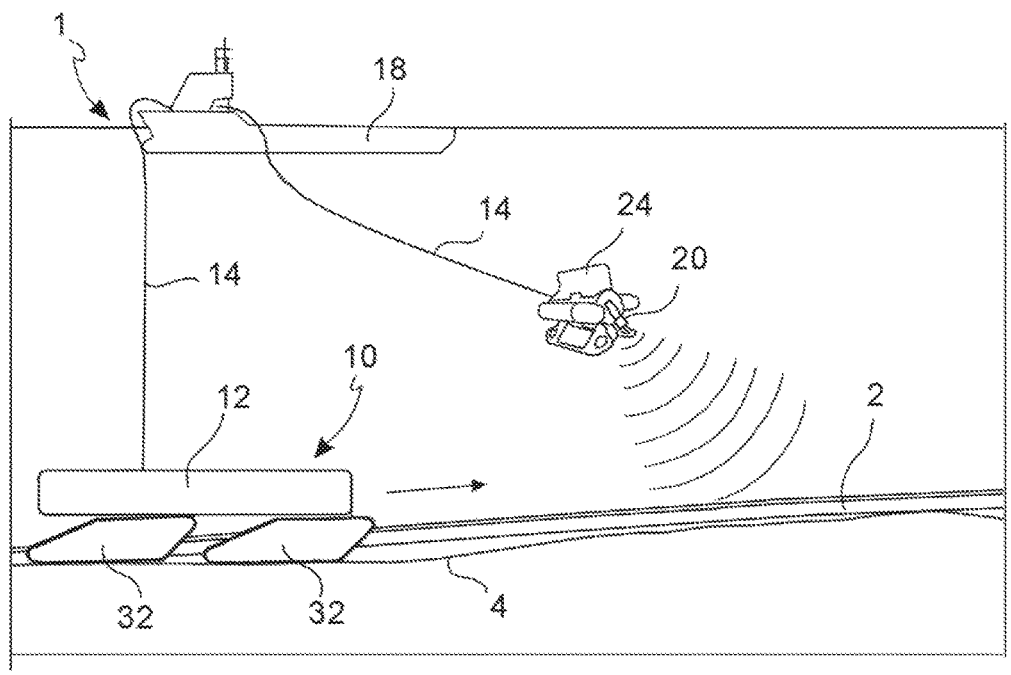
Figure 3:
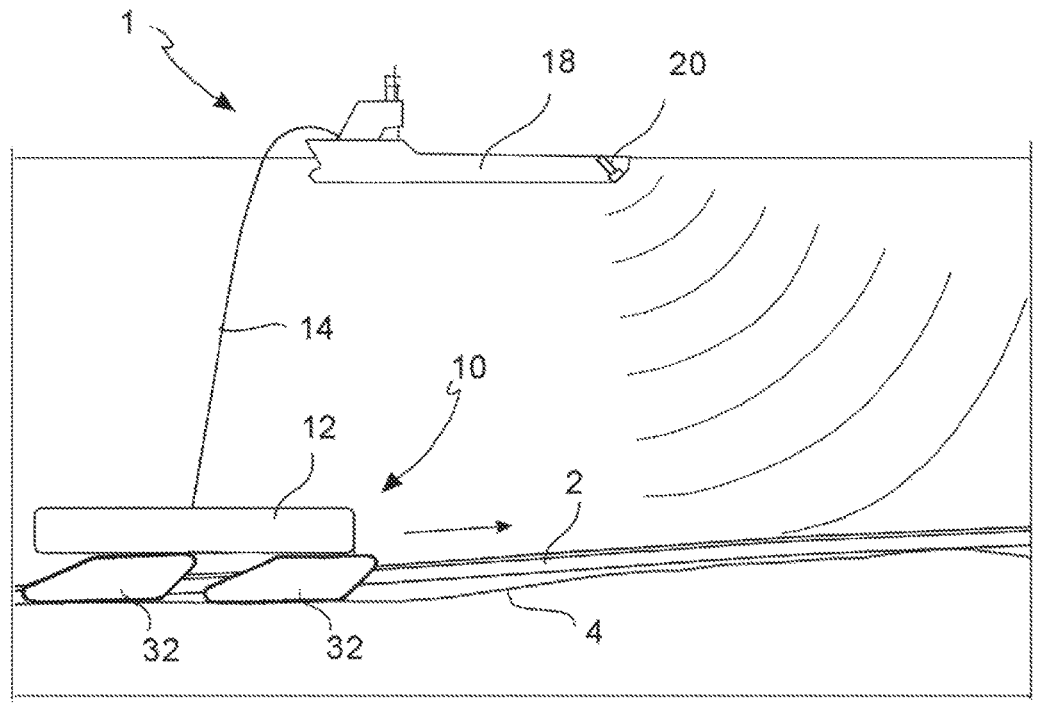
Figure 4:
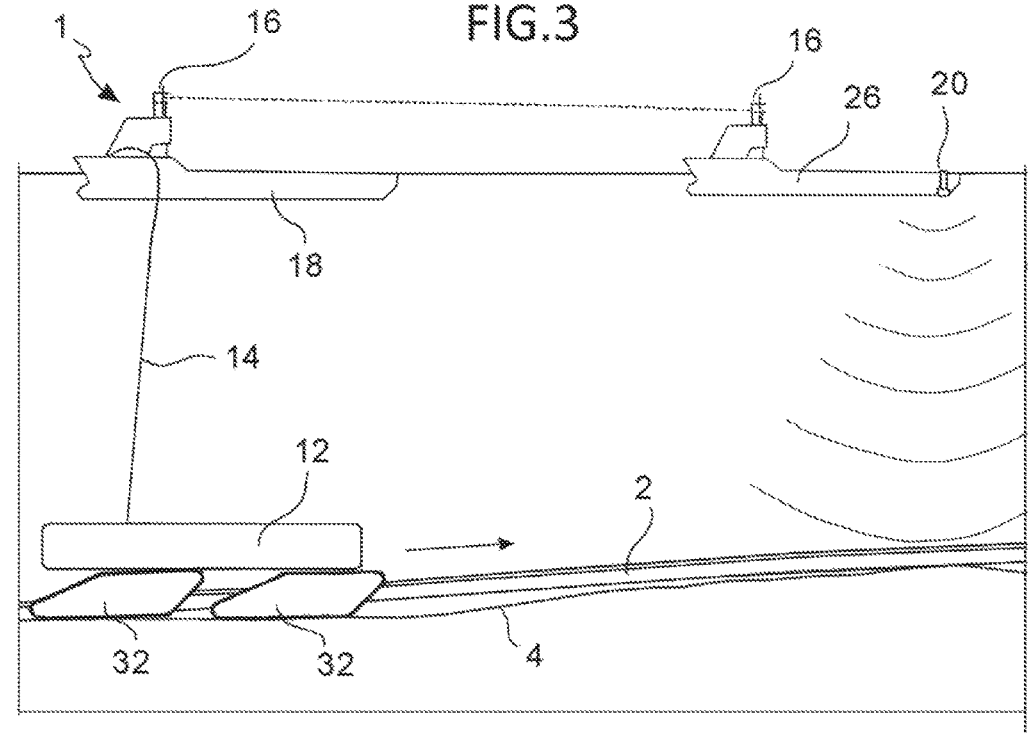
Figure 5A:
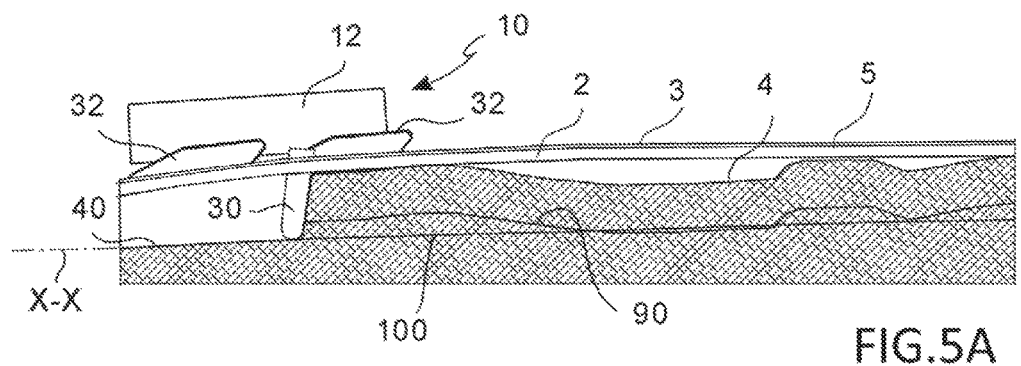
Figure 5B:
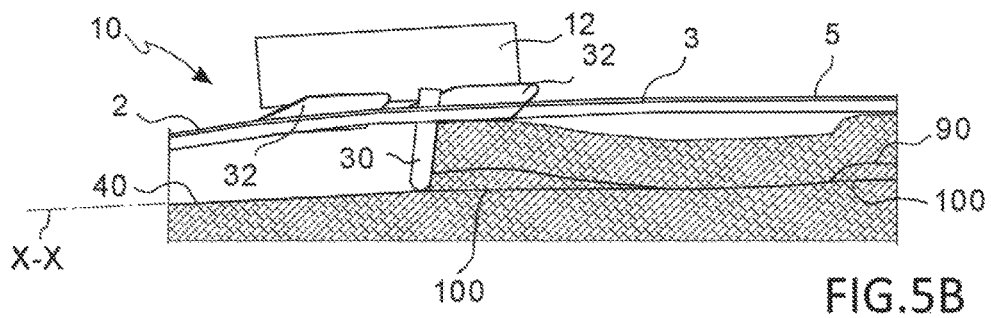
Figure 5C:
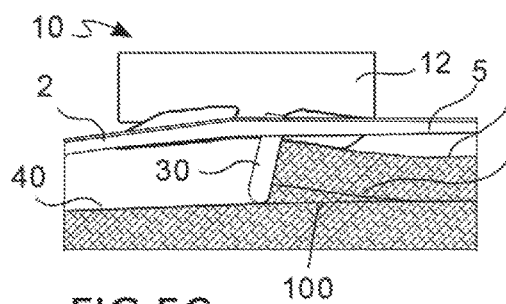
Figure 5D:
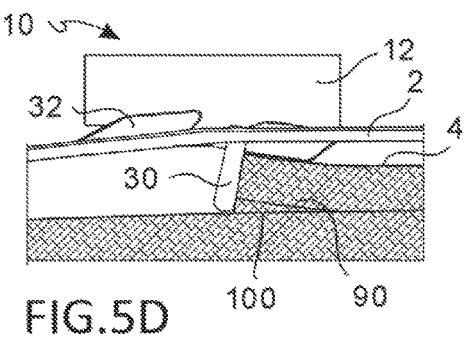
Figure 5E:
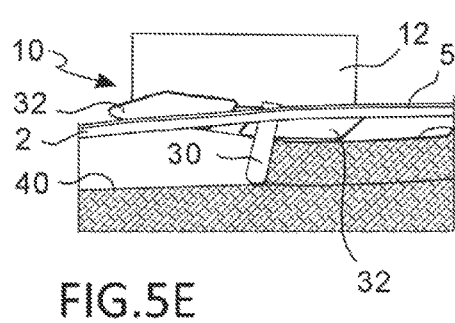
Figure 5F:
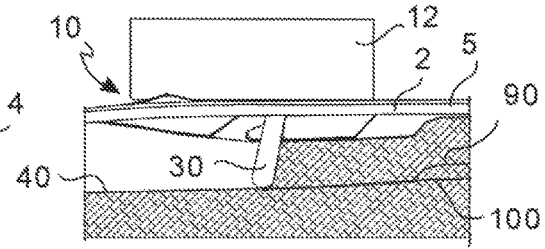
Figure 6B:
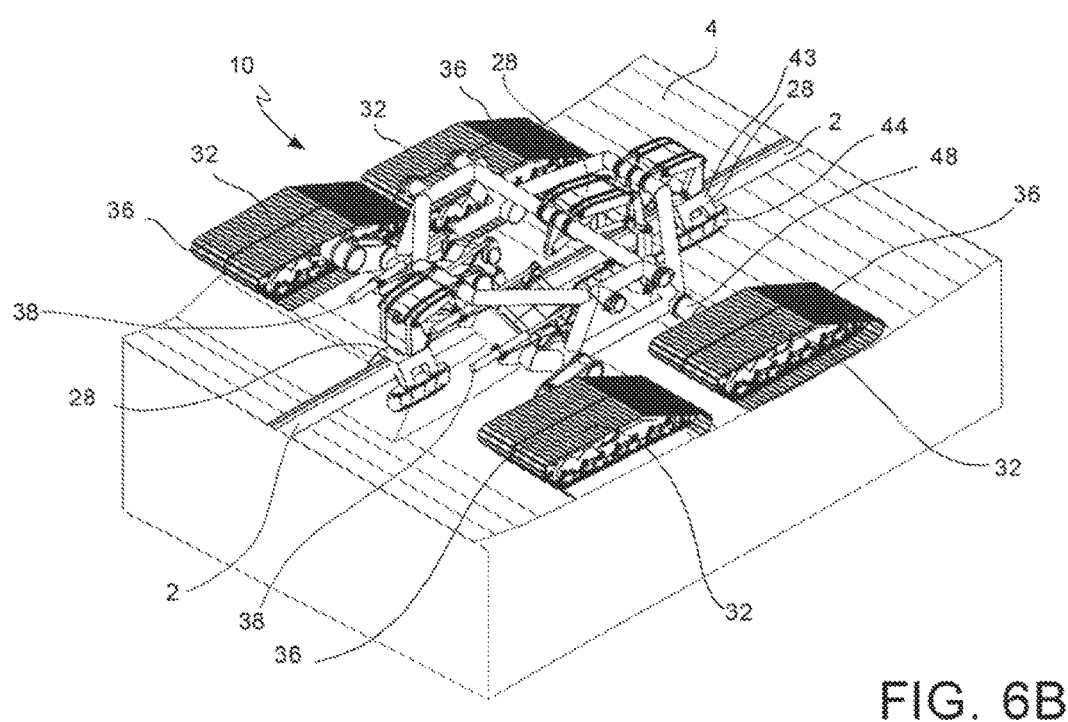
FIG. 6B is a perspective view of a trench digging device.
Figure 7A:
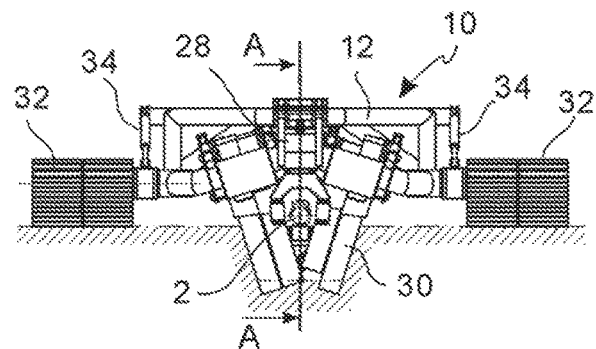
Figure 7B:
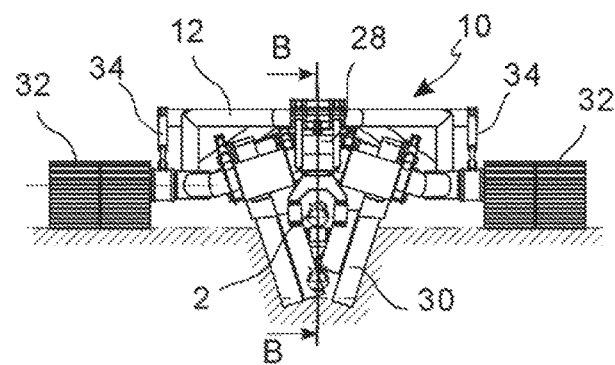
Figure 7C:
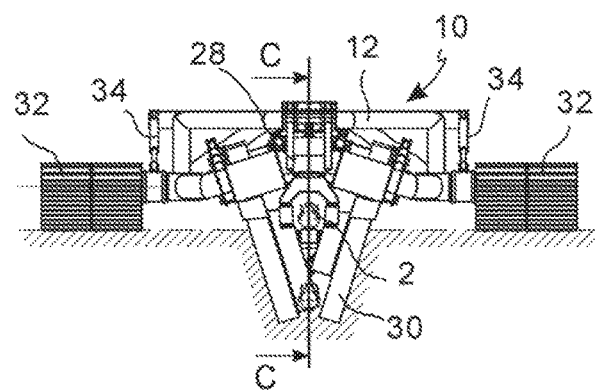
Figure 7D:
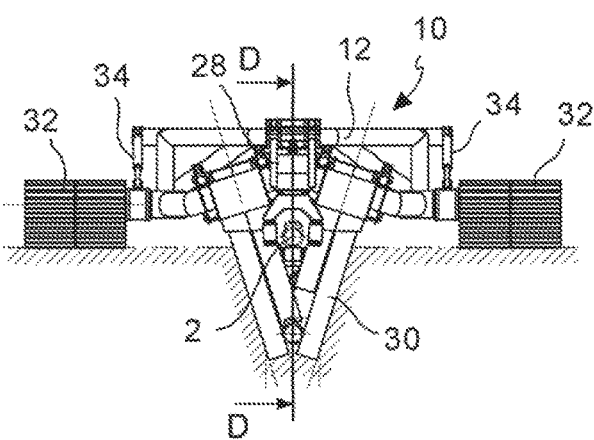
Figure 7E:
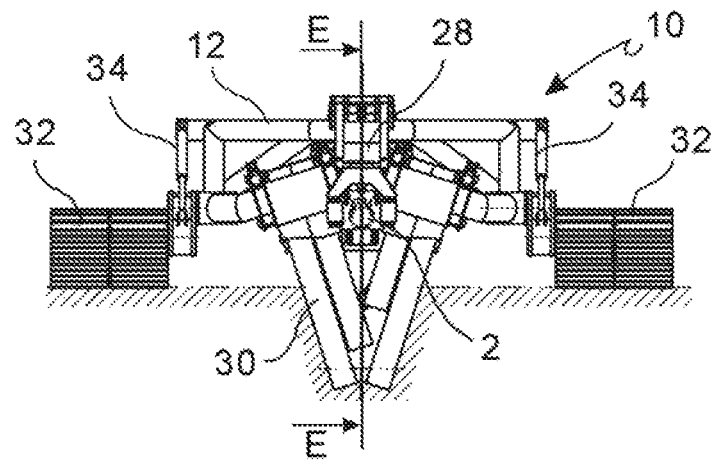
Figure 7F:
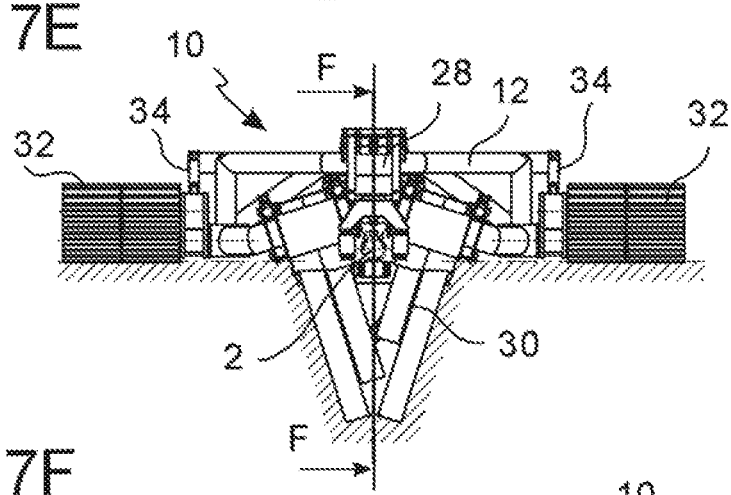
Figure 7G:
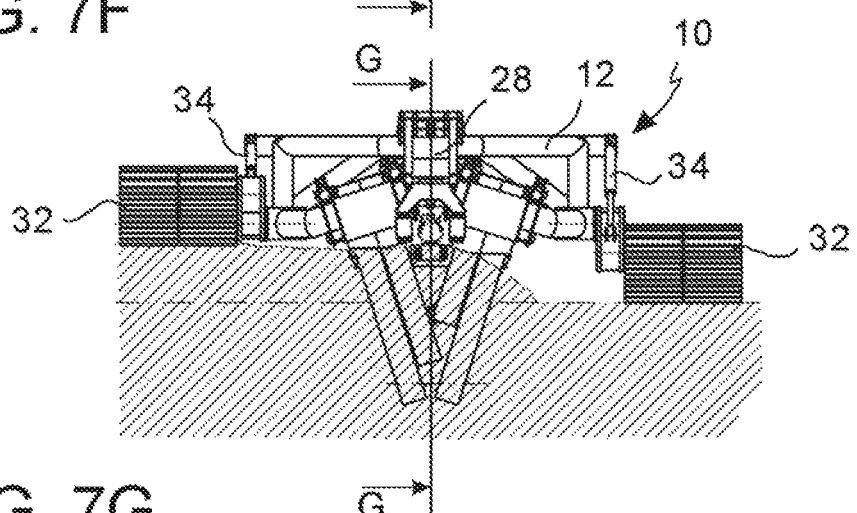
Figure 8A:
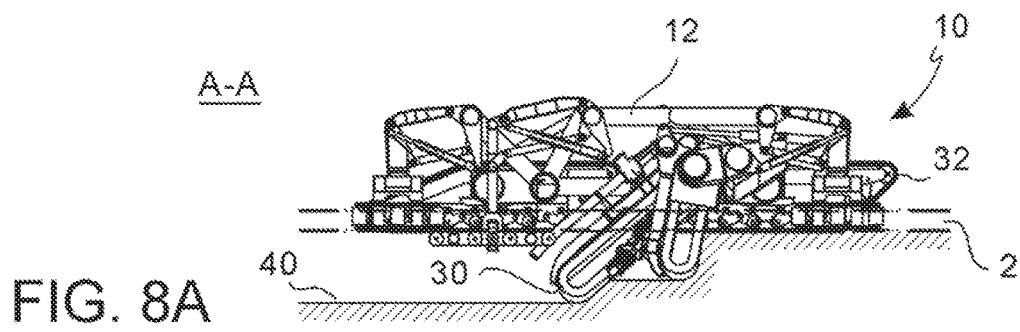
Figure 8B:
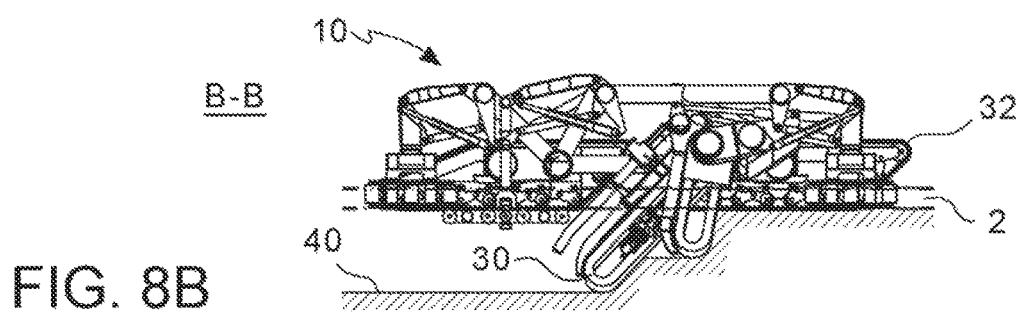
Figure 8C:
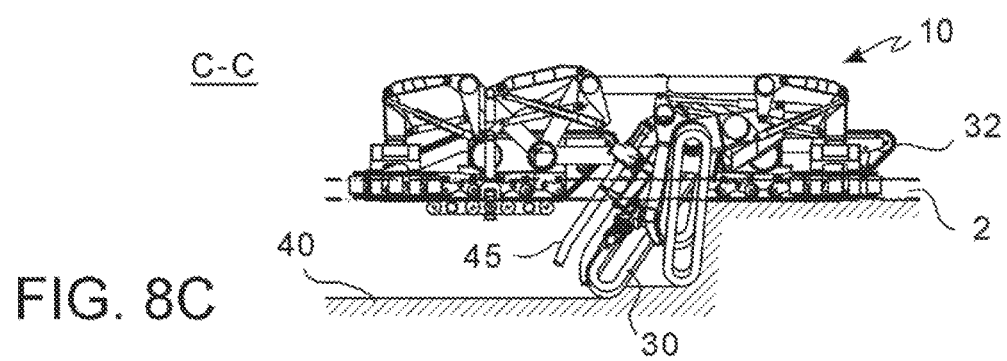
Figure 8D:
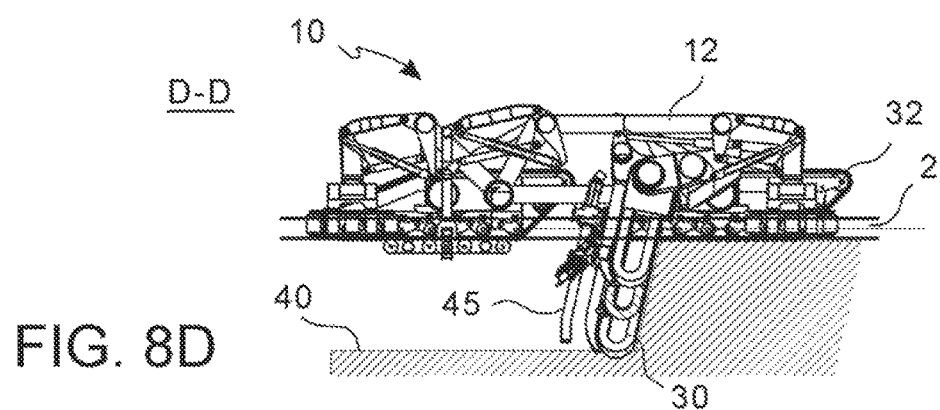
Figure 8E:
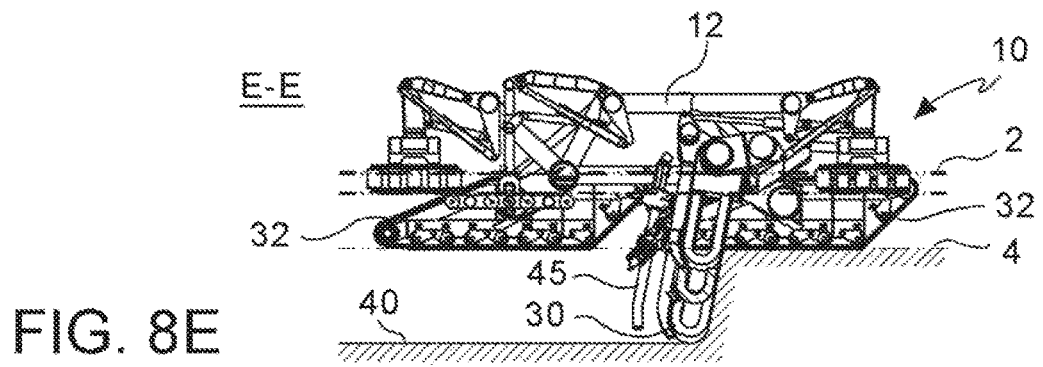
Figure 8F:
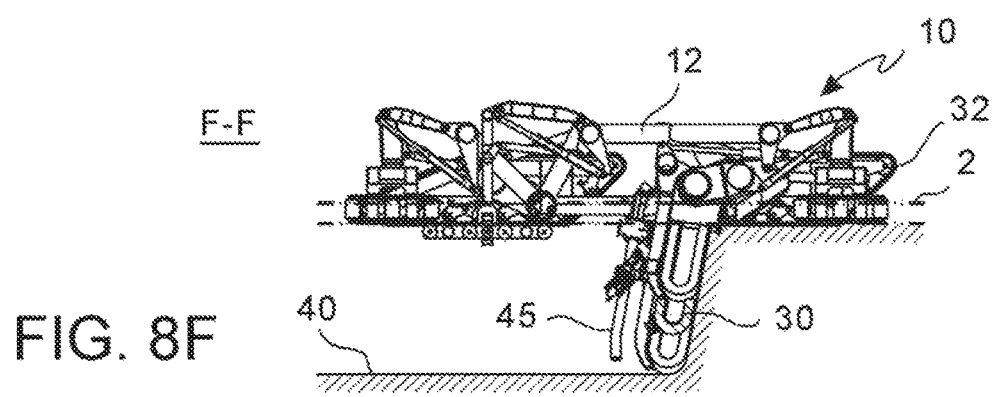
Figure 8G:
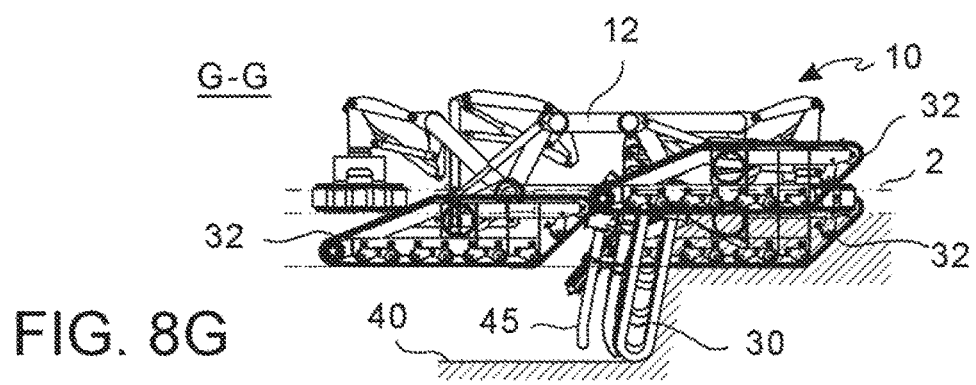
Figure 9A:
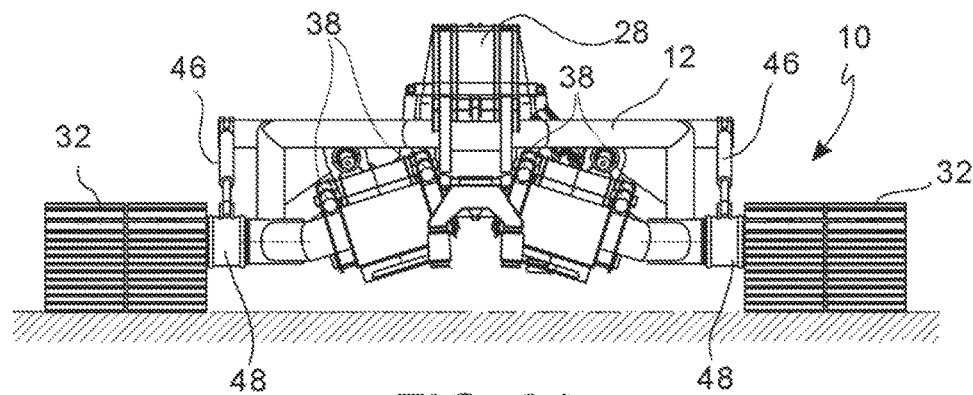
Figure 9C:
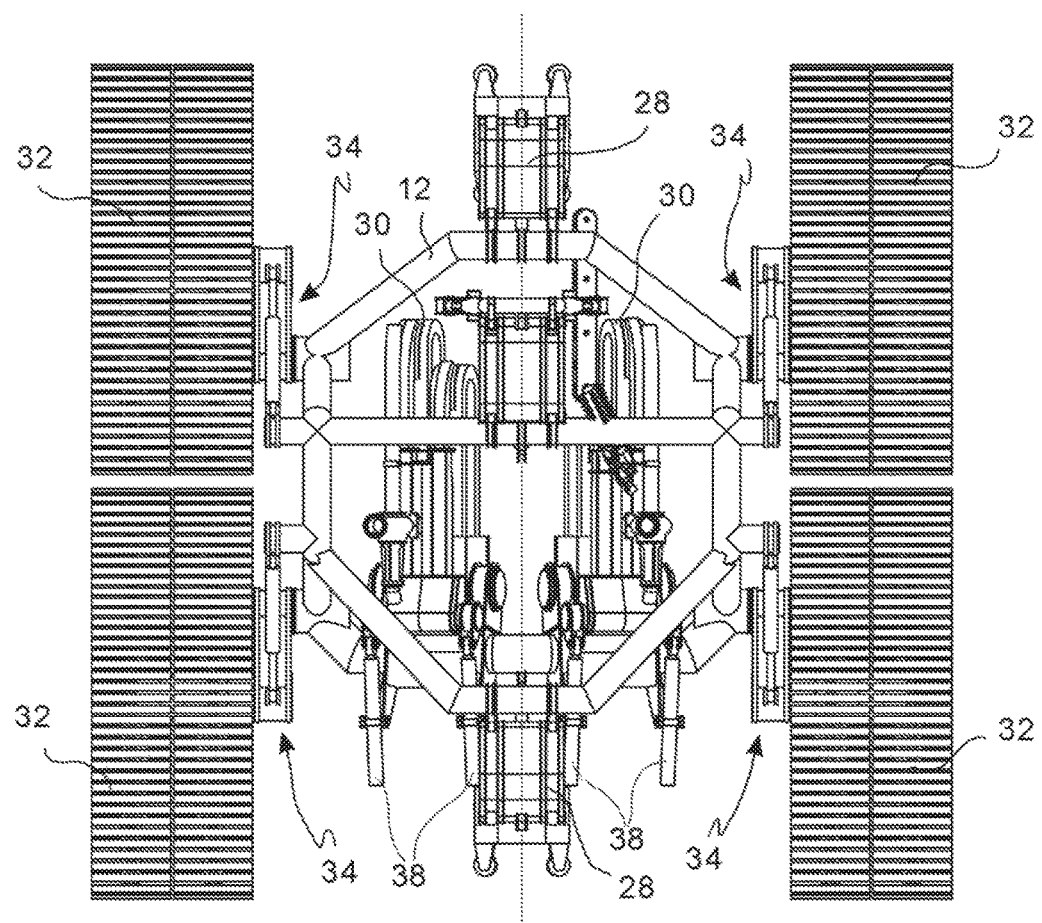
Figure 9B:
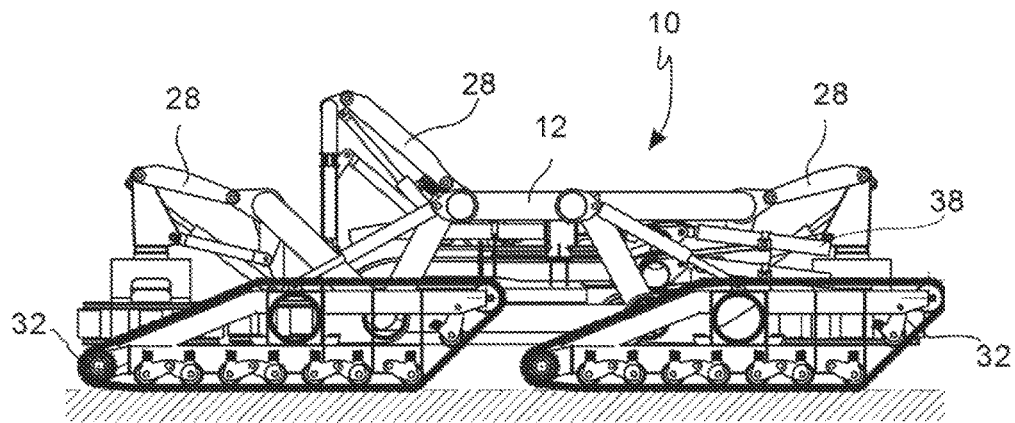
Figure 9D:
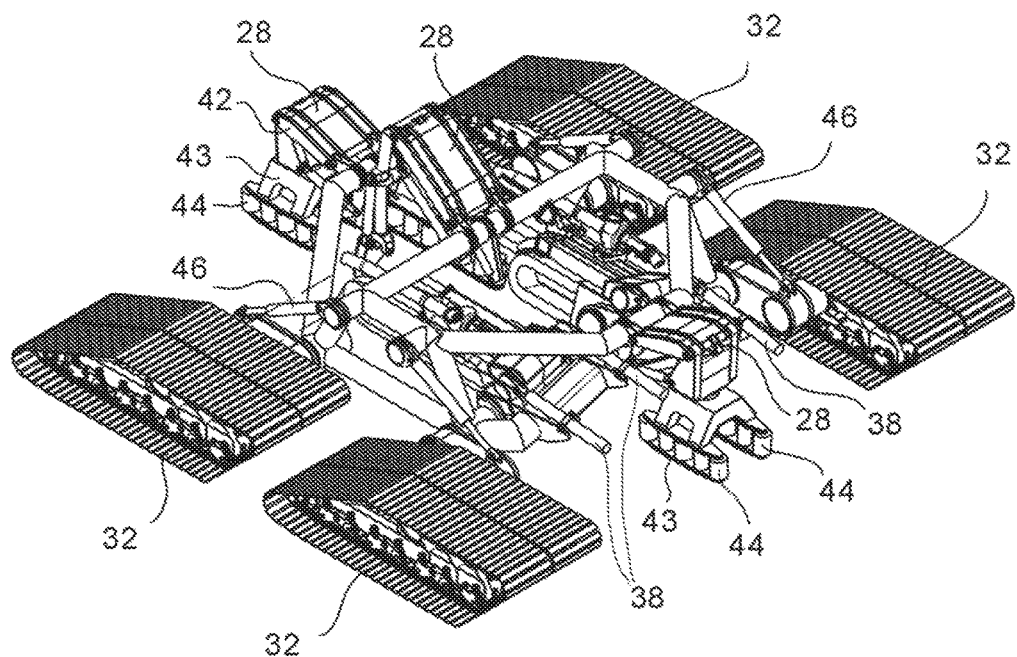
Figure 10A:
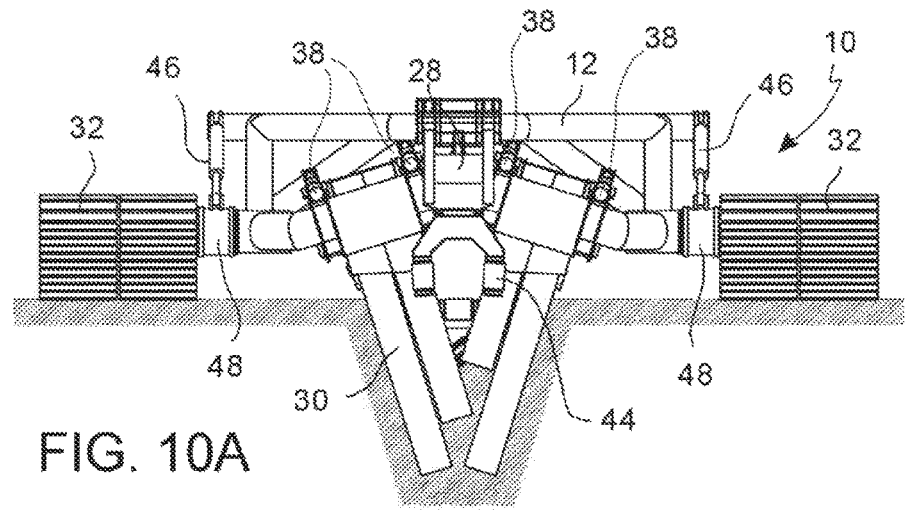
Figure 10C:
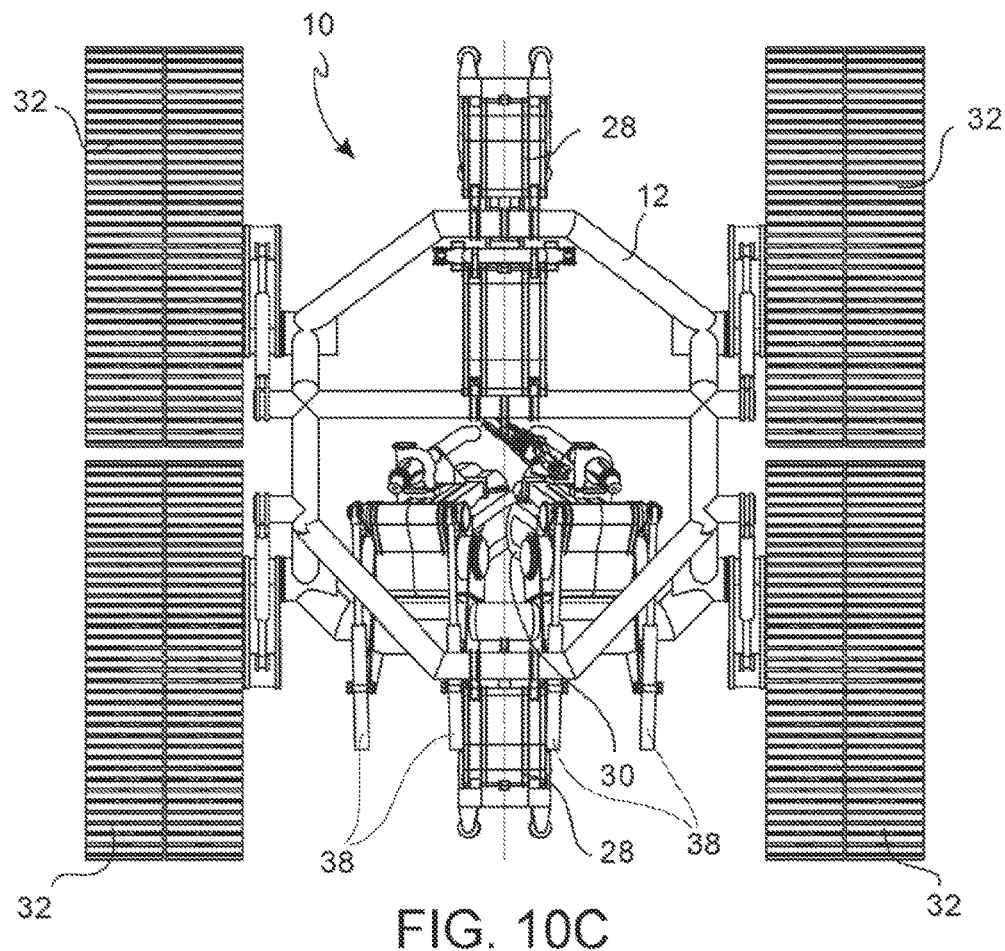
Figure 10B:
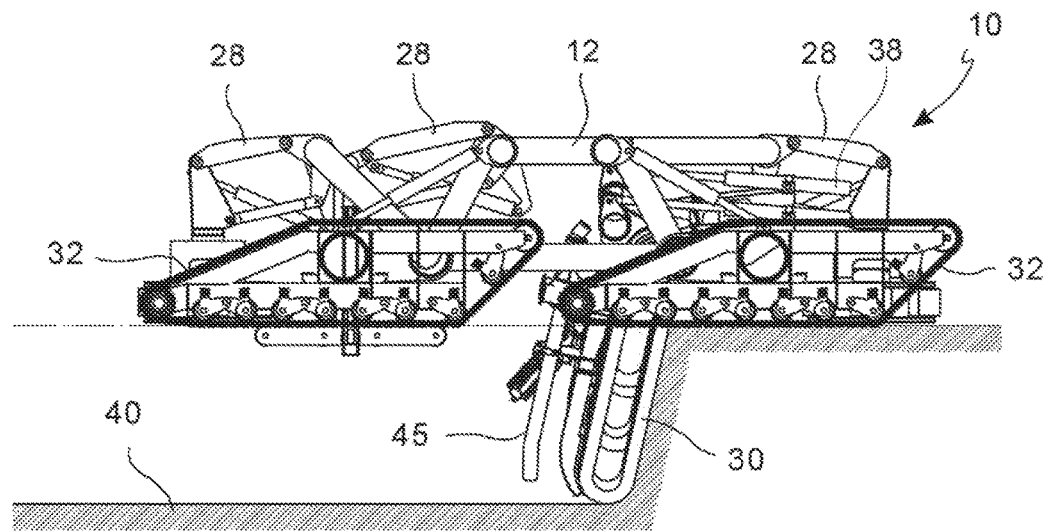
Figure 10D:
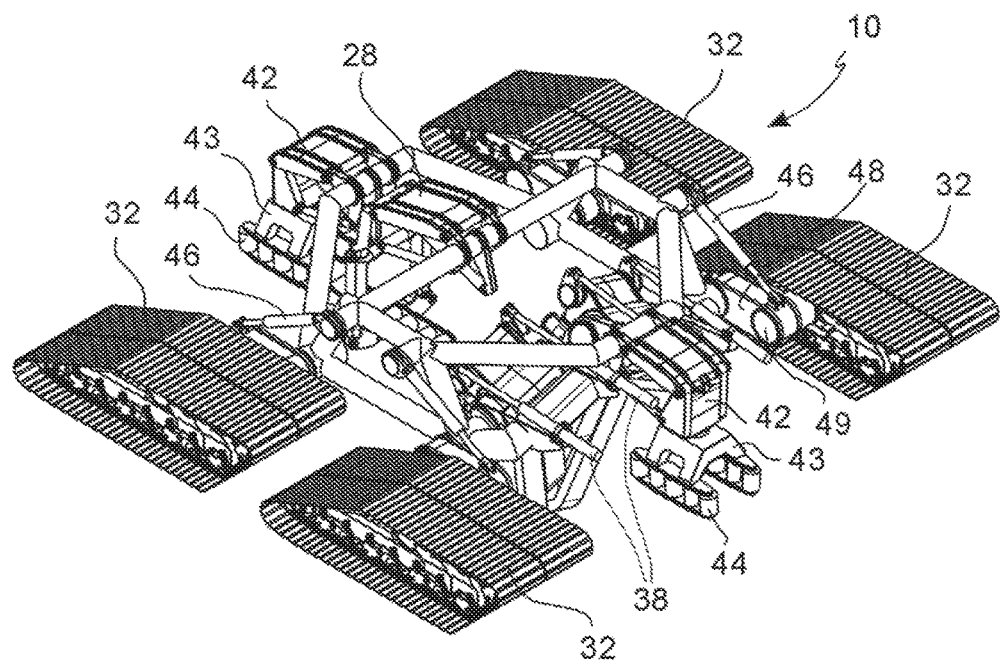

FIGS. 7A-G are front views of a trench digging device;

FIGS. 8A-G are section views along the lines A-A, B-B, C-C, D-D, E-E, F-F, G-G, respectively, of FIGS. 7A-G;

FIGS. 9A-D are respective front, side, top and axonometric views of a trench digging device, in which the trench cutting tool is in rest position;

FIGS. 10A-D are respective front, side, top and axonometric views of a trench digging device, in which the trench cutting tool is in a work position;

FIGS. 11A-C are block diagrams that illustrate a control system in accordance with some embodiments.

DESCRIPTION OF SOME PREFERRED EMBODIMENTS

In accordance with a general embodiment, a trenching assembly 1 for laying in a trench dug in a bed with uneven bathymetry a continuous pipeline 2, said continuous pipeline 2 being suitable for being buried in said trench, said trench extending predominantly along a longitudinal direction X-X, comprises:

a trench digging device 10;
at least one detection device 20;
at least one control device 101;
at least one command device 102.

In accordance with an embodiment, said trench comprises a trench bottom 40, and said continuous pipeline 2 is suitable for being laid on said trench bottom 40.

Said trench digging device 10, comprises a main body 12.

Said trench digging device 10 comprises at least four ground contact units 32, wherein each ground contact unit 32 comprises at least one height adjustment device 34, suitable for affecting at least the position of each ground contact unit 32 with respect to said main body 12 independently; in other words, said height adjustment device 34 is suitable for affecting, independently from one another, the position of each ground contact unit 32.

Said trench digging device 10 comprises at least one trench cutting tool 30, suitable for digging in said bed to make said trench, wherein said trench cutting tool 30 comprises a cutting depth adjustment device 38, suitable for affecting the position of said trench cutting tool 30 with respect to said main body 12.

In accordance with an embodiment, said trench cutting tool 30 is mobile in a rest position, wherein said trench cutting tool 30 is unsuitable for making a trench, and at least one operative position, wherein said trench cutting tool 30 is suitable for digging in said bed.

In accordance with an embodiment, said trench cutting tool 30 is suitable for performing a rotation, swinging or roto-translation movement with respect to said main body 12, between said rest position and said at least one operative position, in the advancing plane of said trench digging device 10, in other words in a plane substantially parallel to the advancing direction of said trench digging device 10. Said advancing plane is defined as a plane parallel to the advancing direction of the trench digging device 10 and passing through at least one portion of said main body 12, preferably but not necessarily passing through the barycenter of said main body 12. In other words said trench cutting tool 30 moves in said rest position and said at least one operative position by means of a rotation, swinging in an advancing plane, substantially parallel to said longitudinal direction X-X and passing through at least one portion of said main body 12, preferably but not necessarily passing through the barycenter of said main body 12.

In accordance with an embodiment, said cutting tool 30 is suitable for performing a movement at least of telescopic translation with respect to said main body 12, between said rest position and said at least one operative position. In accordance with an embodiment, said telescopic translation movement takes place substantially in said advancing plane.

Said at least one detection device 20 is suitable for detecting the bathymetry of the bed 4 during the excavation.

In accordance with an embodiment, said detection device 20 is suitable for detecting the bathymetry of the bed 4 during the excavation a few moments before said trench cutting tool 30 of said trench digging device 10 is in a position suitable for digging the trench in the bed portion 4 for which the bathymetry has just been detected. In other words, said at least one detection device 20 is suitable for detecting, during the excavation, the bathymetry of bed portions 4, in advance of the passing of said trench digging device 10. In other words, said at least one detection device 20 is suitable for detecting, simultaneously with the excavation, the bathymetry of bed portions 4 in which a trench has not yet been dug.

Said at least one control device 101 is suitable for simultaneously allowing the cooperation at least between:
said detection device 20, and
said height adjustment device 34 of each of said ground contact units 32, and
said cutting depth adjustment device 38.

Said at least one command device 102 cooperates with said at least one control device 101 to affect said height adjustment device 34 of each of said ground contact units 32 and of said cutting depth adjustment device 38, so as to make said trench having height difference along the longitudinal direction X-X lower than a predefined tolerance 103 and having a predetermined burial depth 104.

In other words, the height difference along the longitudinal direction X-X of said trench bottom 40 is less than a predefined tolerance 103 and it at a predetermined burial depth 104.

The term "predefined tolerance" is meant to indicate a threshold geometric value that represents the upper limit that the height difference along the longitudinal direction X-X of the trench can take, to avoid the occurrence of localized bending.

The value of said predefined tolerance can vary based on the type of material from which the continuous pipeline 2 is made or in relation to the dimensions of the continuous pipeline 2.

In accordance with an embodiment, the value of said height difference along the direction X-X is comprised between 0 meters and 1 meter every 20-50 meters of trench along the longitudinal direction X-X and preferably between 0.1 meters and 0.5 meters every 20-50 meters of trench along the longitudinal direction X-X.

In accordance with an embodiment, said predefined tolerance 103 is substantially 1 meter every 20 meters of trench along the longitudinal direction X-X. In accordance with an embodiment, said predefined tolerance is substantially 1 meter every 50 meters of trench along the longitudinal direction X-X. In accordance with an embodiment, said predefined tolerance 103 is substantially 0.5 meters every 20 meters of trench along the longitudinal direction X-X. In accordance with an embodiment, said predefined tolerance 103 is substantially 0.1 meters every 20 meters of trench along the longitudinal direction X-X. In accordance with an embodiment, said predefined tolerance is substantially 0.5 meters every 50 meters of trench along the longitudinal direction X-X. In accordance with an embodiment, said predefined tolerance 103 is substantially 0.1 meters every 50 meters of trench along the longitudinal direction X-X.

The term "burial depth" is meant to indicate the depth of the trench dug in the bed. Said continuous pipeline 2 is suitable for being buried in said trench and covered with a certain amount of material.

The burial depth can undergo variations according to the different portions of one same continuous pipeline 2.

In accordance with an embodiment, the burial depth is comprised between 0 meters and 10 meters. In accordance with an embodiment, said burial depth is preferably comprised between 0 meters and 6 meters.

The height difference along the longitudinal direction X-X of said trench must be less than said predefined tolerance 103 so as to avoid the occurrence of localized bending on said continuous pipeline 2 buried in said trench. In other words, the height difference along the longitudinal direction X-X of said trench bottom 40 is less than a predefined tolerance 103, so as to avoid the occurrence of localized bending on said continuous pipeline 2 laid on said trench bottom 40.

In accordance with an embodiment, said control device 101 is suitable for comparing at least the information on the bathymetry with said predefined tolerance 103 and with said predetermined burial depth 104, to process an expected digging profile 100, and wherein said control device 101 cooperates with said command device 102 to affect at least said cutting depth adjustment device 38, so as to make a trench having trench bottom 40 substantially corresponding to said expected digging profile 100.

In accordance with an embodiment, said control device 101 at a first instance processes at least information on the bathymetry of the bed 4 acquired by said detection device 20 and said predetermined burial depth 104 to generate a predicted digging profile 90, and at a second instance, after said first instance, compare said predicted digging profile 90 with said predefined tolerance 103 to generate said expected digging profile 100.

In accordance with an embodiment, said predicted digging profile 90 substantially corresponds to the geometric translation operation, by an amount equal to said predetermined burial depth 104, of the profile deriving from the information on the bathymetry of the bed 4 detected in a bed portion 4 suitable for laying the continuous pipeline 2.

The provision of said control device 101 makes said trenching assembly 1 suitable for actuating, during the excavation, a predictive control of the digging and advancing parameters, like for example the relative position of said digging tool 30 and said main body 12, or the depth and the relative position of the elements comprised in said digging tool 30, and the relative position of each of said ground contact units 32 with respect to said main body 12. Said predictive control is based on the information on the bathymetry of the bed 4, so as to actuate said command device 102 to reach digging objectives, like for example predetermined burial depth 104 and height difference along the longitudinal direction X-X less than a predefined tolerance 103.

Advantageously, the provision of a trenching assembly 1 capable of making in a bed 4 having uneven bathymetry a trench having a height difference along the longitudinal direction X-X less than a predefined tolerance 103 and having a predetermined burial depth 104 makes it possible to safely bury a continuous pipeline 2 also in the presence of a bed 4 having irregular and uneven bathymetry, without having to level the bed.

Advantageously, the provision of a trenching assembly 1 of a continuous pipeline 2 comprising control device 101 based on the detection of the bathymetry of the bed 4 makes it possible to perform a pre-survey aimed at identifying the best-fit solution, with sufficient warning to ensure the possibility of intervening on the digging parameters, like for example the burial depth of the continuous pipeline 2 and the height difference along the longitudinal direction X-X, or straightness of the continuous pipeline 2.

Advantageously, the provision of a control system 101 that cooperates with the information on the bathymetry of the bed 4 detected by said detection system 20 makes it possible to predict the presence of possible fixed or mobile obstacles on the bed as well as yielding portions of the bed 4, with sufficient warning to actuate said command device 102, to affect said height adjustment devices 34 of said ground contact units 32, so as to prevent mechanical damage to said trench digging device 10 during its movement on the bed having irregular and/or uneven bathymetry.

In accordance with an embodiment, said detection device 20 comprises an acoustic localization device, for example sonar using single beam or multibeam scanning or a panoramic echo sounder, or it comprises a laser.

The provision of an acoustic localization device makes it possible to detect the bathymetry of the bed 4 in beds in which visibility is poor or zero, like for example, but not necessarily, in deep water. The provision of an acoustic localization device makes it possible to detect the bathymetry of the bed 4 during the excavation step, in which turbulence, dust and/or debris generated by said digging tool 30 make visibility poor or zero.

In accordance with an embodiment, said detection device 20 is suitable for cooperating with a satellite positioning system, for example GPS.

In accordance with an embodiment, said control device 101 comprises at least one first data processing unit 105, suitable for processing information at least on the bathymetry of the bed 4 and a control room, suitable for reporting information at least on the bathymetry of the bed 4 to an operator, and wherein said operator actuates said command device 102 so as to affect said height adjustment device 34 and said cutting depth adjustment device 38.

In accordance with an embodiment, said control room comprises at least one interface 107, suitable for allowing said operator to actuate said command device 102. In accordance with an embodiment, said interface 107 comprises a visual display unit.

The provision of a control room allows an operator to take decisions on the actuation of said command device 102 based on information at least on the bathymetry of the bed 4.

In accordance with an embodiment, said control device 101 comprises at least one programmable logic controller, or PLC. In accordance with an embodiment, said control device comprises at least one digital electronic device.

In accordance with an embodiment, said control device 101 comprises at least one first data processing unit 105, suitable for processing information at least on the bathymetry of the bed 4, and at least one second data processing unit 106, wherein said second data processing unit 106 actuates said command device 102 to automatically affect said height adjustment device 34 and said cutting depth adjustment device 38.

The provision of said second data processing unit 106 makes it possible to automate the decision process on the actuation of said command device 102 based on at least information on the bathymetry of the bed 4.

In accordance with an embodiment, said first data processing unit 105 and said second data processing unit 106 are a single data processing unit.

In accordance with an embodiment, said predefined tolerance 103 is defined based on the settings of an operator. In accordance with an embodiment, said predetermined burial depth 104 is defined based on the settings of an operator.

In accordance with an embodiment said predefined tolerance 103 is set automatically. In accordance with an embodiment, said control device 101 automatically establishes said predefined tolerance 103 based on information relative to the type of continuous pipeline 2 or to geophysical parameters of the bed 4.

In accordance with an embodiment, said trench digging device 10 is suitable for performing "pre-trenching" operations. In other words, said trench digging device 10 is suitable for digging said trench before laying said continuous pipeline 2.

In accordance with an embodiment, said trench digging device 10 is suitable for performing "post-trenching" operations. In other words, the digging of the trench takes place when the continuous pipeline is already laid on the bed. In other words, the continuous pipeline 2 comprises at least one pipeline portion to be laid 5 laid on said bed having uneven bathymetry substantially along an extension of said longitudinal direction X-X.

In accordance with an embodiment, said pipeline portion to be laid 5 comprises at least one suspended pipeline portion 3, suspended between two successive resting points. In other words, said pipeline portion to be laid 5 can have a substantially different profile from the bathymetry of the bed 4 detected through said detection device 20.

In accordance with an embodiment, said detection device 20 is suitable for detecting, during the excavation, the position di at least one portion of said continuous pipeline 2.

The provision of a detection device 20 suitable for detecting, during the excavation, the position of at least one portion of said continuous pipeline 2, allows said trench digging device 10 to be positioned in a variety of configurations with respect to the position of said continuous pipeline 2.

In accordance with an embodiment, said detection device 20 is suitable for detecting, during the excavation, the position of said pipeline portion to be laid 5.

In accordance with an embodiment, said detection device 20 is suitable for detecting, during the excavation, the position of said at least one suspended pipeline portion 3.

The provision of detection device 20 suitable for detecting, during the excavation, the position of at least one suspended pipeline portion 3, makes it possible to lay said continuous pipeline 2 in a trench made in the bed 4 having uneven bathymetry, respecting said predetermined burial depth 104 and said predefined tolerance 103, even when said continuous pipeline 2 comprises at least one suspended pipeline portion 3, i.e. not resting on the bed 4.

In accordance with an embodiment, said first data processing unit 105 is suitable for separating information on the bathymetry of the bed 4 from the information on the positioning of said pipeline portion to be laid 5.

In accordance with an embodiment, said main body 12 of said digging device 10 is suitable for maintaining constant balance conditions or gradually variable balance conditions, when in operative conditions, irrespective of the irregularities of the bed 4.

The term "constant balance conditions" or the term "gradually variable balance conditions" are meant to indicate the ability of said trench digging device 10 to maintain the stable balance condition, irrespective of the irregularities of the bed 4, wherein said main body 12 substantially equally spreads its weight over each of said at least four ground contact units 32. In constant balance conditions, or gradually variable balance conditions, said trench cutting tool 30 offers optimal cutting performance.

In accordance with an embodiment, said control device 101 is suitable for actuating a feedback control on the inclination of said main body 12 so as to actuate said command device 102 to affect at least said height adjustment device 34 of at least one di said ground contact units 32, to maintain the constant balance conditions or gradually variable balance conditions of said trench digging device 10. In other words, the stresses deriving from the reaction of the bed terrain 4 to the digging action are compensated by the provision of said control device 101 that cooperates with said command device 102 to affect said height adjustment device 34 of each di said ground contact units 32.

The provision of at least four independently mobile ground contact units 32 allows the trench digging device 10 to maintain constant balance conditions in an improved manner with respect to a trench digging device 10 comprising for example only two independently mobile ground contact units 32.

In accordance with an embodiment, said control device 101 comprises at least one alignment sensor (not shown in the figures), mounted on said main body 12 of said trench digging device 10, said alignment sensor being suitable for carrying out inclinometric or gyroscopic measurements. In accordance with an embodiment, said alignment sensor is for example a miniaturized digital inclinometer or a piezoelectric gyroscope.

In accordance with an embodiment, to maintain the constant balance conditions, or gradually variable balance conditions, the range of variation of the inclination angle del main body 12 must be comprised between 0° and 5° every 10 meters of movement of the trench digging device 10 on the bed 4. The provision of an inclination angle comprised between 0° and 5° every 10 meters of movement of the trench digging device 10 on the bed 4 ensures the constant balance conditions, or gradually variable balance conditions, so as to allow optimal cutting performance of said trench cutting tool 30.

In accordance with an embodiment, said control device 101 is suitable for performing a feedback loop control on the position of said cutting tool 30 so as to actuate said command device 102 to affect said height adjustment device 34 of at least one of said ground contact units 32 and/or said cutting depth adjustment device 38, so as to maintain the constant balance conditions of said trench digging device 10.

In accordance with an embodiment, said control device 101 comprises at least one cutting sensor (not shown in the figures) mounted on said trench cutting tool 30, said cutting sensor is for example an inclinometer suitable for detecting the inclination of said cutting tool.

The provision of a feedback loop control on the position of said trench cutting tool 30 makes it possible to prevent undesired movements of said trench cutting tool 30 suitable for damaging the continuous pipeline 2.

In accordance with an embodiment, said trench cutting tool 30 comprises at least one milling group, suitable for making a trench having a straight generatrix. In accordance with an embodiment, said trench cutting tool 30 comprises at least one milling group comprising at least one chain transmission miller. The provision of a chain transmission miller makes said trench cutting tool 30 suitable for digging a trench in a rocky bed.

In accordance with an embodiment, said at least one cutting sensor is a load cell, an extensimeter or a piezoelectric force transducer, suitable for detecting the force acting on a portion of said trench cutting tool 30.

The provision of at least one cutting sensor suitable for detecting the force acting on a portion of said trench cutting tool 30, for example a force generated by the rocky bed on the chain of the chain transmission mill of said trench cutting tool 30, makes it possible to monitor the stress conditions of said trench cutting tool 30 and therefore prevent damage to said trench cutting tool 30 deriving from undesired interaction with the bed 4.

In accordance with an embodiment, said trench cutting tool 30 is suitable for performing a rotation or swinging movement in a transversal plane, in other words in a plane substantially perpendicular to the advancing direction of the digging device 10.

In accordance with an embodiment, said control device 101 is suitable for performing a feedback loop control on the position of said cutting tool 30 in said transversal plane, so as to actuate said command device 102 to move said trench cutting tool 30 in said transversal plane.

Thanks to the provision of a trench cutting tool 30 that is adjustable in said transversal plane, it is possible to adjust the inclination of said trench cutting tool 30 where there is no way to adjust the alignment of said trench digging device 10, for example due to sudden events or excessive unbalancing of said main body 12, in order to limit the undesired lateral load acting on said trench cutting tool 30 that could damage said trench cutting tool 30.

In accordance with an embodiment, said trench cutting tool 30 comprises a suction device 45, suitable for sucking the bed earth broken up while making the trench.

In accordance with an embodiment, said trench cutting tool 30 comprises an underwater plough, suitable for cutting a bed.

In accordance with an embodiment, said trench cutting tool 30 comprises at least one cutting tool of the waterjetting type.

In accordance with an embodiment, said support vehicle 18 is connected to said main body 12 of said trench digging device 10 through a connection cable 14, suitable for transmitting a flow of electrical energy and/or a flow of information and/or a flow of fluid or a hydraulic flow. In accordance with an embodiment, said support vehicle 18 comprises said detection device 20.

The provision of said support vehicle 18 comprising said detection device 20 makes it possible to arranged the functions of supplying the trench digging device 10 and of detecting at least the bathymetry of the bed 4 in a single vehicle.

In accordance with an embodiment, said support vehicle 18 comprises said control device 101. In accordance with an embodiment, said support vehicle 18 comprises said control room. In accordance with an embodiment, said support vehicle 18 comprises said interface 107. In accordance with an embodiment, said support vehicle 18 comprises said command device 102.

In accordance with an embodiment, said support vehicle 18 is an aquatic vehicle, like for example, a ship or a vessel.

In accordance with an embodiment, said trenching assembly 1 comprises a detection device 24,26, suitable for being directly or indirectly connected at least to said trench digging device 10, said detection device 24,26 comprising said detection device 20.

In accordance with an embodiment, said detection device 24,26 is an aquatic vehicle and comprises at least one radio station 16, and said support vehicle 18 comprises at least one radio station 16, so as to form a radio frequency connection between said detection device 20, when arranged on said detection device 24,26 and said at least one control device, arranged on or connected to said support vehicle 18.

The provision of a detection device 24,26 comprising said detection device 20 and connected by means of radio frequency connection with said support vehicle 18 makes it possible to detect the bathymetry of the bed 4 with improved freedom of movement.

In accordance with an embodiment, said detection device 24,26 is a remotely operated submarine 24, or ROV 24. In accordance with an embodiment, said remotely operated submarine 24 is connected to said main body 12 of said trench digging device 10 by means of a further connection cable 14, suitable for transmitting a flow of electric energy and/or a flow of information.

In accordance with an embodiment, said detection device 24,26 comprises said control device 101. In accordance with an embodiment, detection device 24,26 comprises said command device 102.

In accordance with an embodiment, said trenching assembly 1 comprises at least one mechanical arm 22, suitable for being connected at least mechanically to said main body 12.

In accordance with an embodiment, said mechanical arm 22 comprises said detection device 20.

In accordance with an embodiment, said mechanical arm 22 comprising said detection device 20 is primarily suitable for detecting the bathymetry of bed portions 4 arranged in the advancing direction of the trench digging device 10.

In accordance with an embodiment, said main body 12 of said trench digging device 10 comprises said control device 101.

In accordance with an embodiment, said main body 12 of said trench digging device 10 comprises said command device 102.

In accordance with an embodiment, said trench digging device 10 comprises said detection device 20, said control device 101 and said command device 102, so as to arrange on a single trench digging device 10 the components suitable for automatically controlling and carrying out the digging of a trench having a predetermined burial depth 104 and a height difference along the longitudinal direction X-X less than a predefined tolerance 103.

In accordance with an embodiment, each of said at least four ground contact units 32 is connected to said main body 12 by means of at least one leg 48, suitable for driving the relative movement between said ground contact units 32 and said main body 12.

In accordance with an embodiment, each of said at least one leg 48 is connected to the respective ground contact units 32 by means of a first mechanical joint 49, suitable for allowing the free rotation between said leg 48 and said respective ground contact units 32 in a movement plane. In accordance with an embodiment, said first mechanical joint 49, suitable for allowing the free rotation between said leg 48 and said respective ground contact units 32 in said movement plane, allows relative movements about an axis orthogonal to said movement plane, or pitch axis Y-Y, between said leg 48 and said respective ground contact units 32. In accordance with an embodiment, each ground contact unit 32 is mobile about the pitch axis Y-Y independently from the other ground contact units 32. In accordance with an embodiment, each ground contact unit 32 comprises a pitch axis Y-Y thereof. In accordance with an embodiment, said trench digging device 10 comprises at least two laterally opposite ground contact units 32 with respect to the front main body, wherein the pitch axis Y-Y of one of said two opposite front ground contact units coincides with the extension of the pitch axis of the other of said laterally opposite ground contact units 32 with respect to the front main body. In accordance with an embodiment, said trench digging device 10 comprises at least two laterally opposite ground contact units 32 with respect to the rear main body, wherein the pitch axis Y-Y of one of said two opposite rear ground contact units coincides with the extension of the pitch axis Y-Y of the other of said two laterally opposite rear ground contact units with respect to the rear main body.

The provision of a joint suitable for allowing relative movements between said leg 48 and said respective ground contact units 32 about the pitch axis Y-Y, allows said trench digging device 10 to proceed on the bed even in the presence of bed portions with large sloping gradients, like for example uneven slopes or sequences of dips and rises close together, as well as in the presence of obstacles such as holes or rocky outcrops, without for this reason losing adherence with the bed. In other words, the provision of a joint suitable for allowing relative movements between said leg 48 and said respective ground contact units 32 about the pitch axis Y-Y, allows said trench digging device 10 to maintain the constant balance conditions, while it proceeds on a bed characterized by high sloping gradients, like for example uneven slopes or sequences of dips and rises close together, as well as in the presence of obstacles such as holes or rocky outcrops.

In accordance with an embodiment, each of said at least one leg 48 is connected to said main body 12 by means of a second mechanical joint 51, suitable for allowing the free rotation between said leg 48 and said main body 12 at least in one plane.

In accordance with an embodiment, said height adjustment device 34 comprises a hydraulic actuator 46, for example of the cylinder-piston type, suitable for connecting said main body 12 with a portion of said leg 48 close to said first mechanical joint 49, and suitable for cooperating with said first mechanical joint 49 and second mechanical joint 51 preventing, by means of rotation movement of said leg 48, the movement of said ground contact units 32 connected to said leg 48 with respect to said main body 12.

In accordance with an embodiment, said height adjustment device 34 is suitable for simultaneously and selectively affecting the position of said ground contact units 32 with respect to said main body 12, and the movement about the pitch axis Y-Y of said ground contact units 32 independently from the other ground contact units 32 of said trench digging device 10.

In accordance with an embodiment, said control device 101 is suitable for actuating said command device 102 to simultaneously and selectively affect the position of said ground contact units 32 with respect to said main body 12, and the movement about the pitch axis Y-Y of said ground contact units 32, based on information on the bathymetry of the bed 4.

In accordance with an embodiment, at least one from said first mechanical joint 49 and said second mechanical joint 51 is a bush-pin type coupling. In accordance with an embodiment, at least one from said first mechanical joint 49 and said second mechanical joint 51 is a ball joint.

In accordance with an embodiment, said ground contact units 32 are unsuitable for steering independently from one another. In accordance with an embodiment, said ground contact units 32 are unsuitable for steering.

In accordance with an embodiment, said at least four ground contact units 32 comprise at least one track 36. The provision of at least one track 36 allows the adherence of said ground contact units 32 on the bed 4 to be maximized.

In accordance with an embodiment, said at least four ground contact units 32 comprise at least two tracks 36, and wherein said at least two tracks 36 are arranged on opposite sides of said main body 12. The provision of at least two tracks 36 arranged on opposite sides of said main body 12 allows said trench digging device 10 to steer, through the effect of the different movement speed of one track 36 with respect to the other, arranged on the opposite side.

In accordance with an embodiment, said at least four ground contact units 32 comprise at least four tracks 36.

In accordance with an embodiment, said four ground contact units 32 comprise at least one sliding block, primarily suitable for sliding on the bed 4. In accordance with an embodiment, said four ground contact units 32 comprise at least one mechanical foot or a robotic foot.

In accordance with an embodiment, said four ground contact units 32 comprise at least one wheel. In accordance with an embodiment, said at least four ground contact units 32 comprise at least two wheels, arranged on opposite sides of said main body 12. The provision of at least two wheels arranged on opposite sides of said main body allows said trench digging device 10 to steer, through the effect of the different rotation speed of one wheel with respect to the other, arranged on the opposite side of said main body 12.

In accordance with an embodiment, said device 10 comprises a protection system 28 of said continuous pipeline 2, suitable for guiding said continuous pipeline 2 so as to prevent the position of said continuous pipeline 2 from interfering with said trench digging tool 30, for example, but not necessarily, when a portion of said continuous pipeline 2 is raised from the bed 4.

In accordance with an embodiment, said protection system 28 comprises a support portion 43, suitable for guiding the relative sliding of said continuous pipeline 2 with respect to said main body 12 of said trench digging device 10, and wherein said support portion 43 comprises at least one roller guide 44, suitable for reducing the sliding friction between said continuous pipeline 2 and said support portion 43.

In accordance with an embodiment, said control device 101 and said command device 102 are connected to at least one portion of said protection system 28.

In accordance with an embodiment, said trenching assembly 1 comprises a support vehicle 18, adapted to supply said trench digging device 10.

Hereinafter a method for laying in a trench dug in a bed 4 having uneven bathymetry a continuous pipeline 2 will be described.

A method for laying in a trench dug in a bed with uneven bathymetry a continuous pipeline 2, comprises the steps of:
providing a trenching assembly 1 in accordance with any one of the embodiments described above;
detecting the bathymetry of the bed 4;
using the bathymetry information to adjust the height position of each ground contact unit 32, independently, and the digging depth of said trench cutting tool 30, to make a trench having a height difference along the longitudinal direction X-X less than a predefined tolerance 103;
burying the continuous pipeline 2 in said trench at a predetermined burial depth 104.

In accordance with a possible way of operating, a method comprises at least one of the following further steps:
setting said predefined tolerance 103;
and/or setting said predetermined burial depth 104;
and/or setting the method for measuring the bathymetry of the bed 4;
and/or detecting the bathymetry of the bed 4 during the excavation of the trench;
and/or processing a predicted digging profile 90 based on the information on the bathymetry of the bed 4;
and/or processing an expected profile 100 based on said predicted digging profile 90 and said predefined tolerance 103 and said predetermined burial depth 104;
and/or making a trench having said trench bottom 40 substantially corresponding to said expected profile 100;
and/or transmitting information on the bathymetry of the bed 4 to said control device 101;
and/or laying said continuous pipeline 2 on said trench bottom 40;
and/or burying said continuous pipeline 2, when laid on said trench bottom 40, by means of a certain amount of material;
and/or making a trench having a predetermined burial depth 104;
and/or making a trench comprising said trench bottom 40 having a height difference along the longitudinal direction X-X less than a predefined tolerance 103;
and/or moving at least one ground contact unit 32 about the pitch axis Y-Y independently from the other ground contact units 32.

Those skilled in the art can bring numerous modifications, adaptations and replacements of elements with other functionally equivalent ones to the embodiments described above, in order to satisfy contingent and specific requirements, without however departing from the scope of the following claims.

LIST OF REFERENCES

1. Trenching assembly
2. Continuous pipeline
3. Suspended portion of continuous pipeline
4. Bathymetry of the bed
5. Portion of continuous pipeline to be buried
10. Trench digging device
12. Main body
14. Connection cable
16. Radio station
18. Support vehicle
20. Detection device
22. Mechanical arm
24. Remotely operated submarine, or ROV
26. Detection device
28. Protection system of the continuous pipeline
30. Cutting tool
32. Ground contact units
34. Height adjustment device
36. Tracks
38. Cutting depth adjustment device
40. Trench bottom
43. Support portion 44. Roller guide
45. Suction device
46. Hydraulic actuator
48. Legs
49. First mechanical joint
51. Second mechanical joint
90. Predicted digging profile
100. Expected profile
101. Control device
102. Command device
103. Predefined tolerance
104. Predetermined burial depth
105. First data processing unit
106. Second data processing unit
107. Interface
X-X. Longitudinal trench direction
Y-Y. Pitch axis of ground contact units

The invention claimed is:

1. An underwater trenching assembly for laying a continuous pipeline in a trench dug in a bed, said continuous pipeline being buried in said trench, said trench extending predominantly along a longitudinal direction; said trenching assembly comprising:
 a trench digging device, comprising:
 a main body;
 at least four ground contact units, wherein each ground contact unit comprises at least one height adjustment device for adjusting at least a position of each ground contact unit with respect to said main body independently from the other ground contact units;
 at least one trench cutting tool, for digging in said bed to obtain said trench, wherein said trench cutting tool comprises a cutting depth adjustment device for adjusting the position of said cutting tool with respect to said main body;
 at least one detection device, for detecting bathymetry of the bed during the excavation;
 at least one control device, for simultaneously allowing cooperation between at least:
  said detection device, and
  said height adjustment device of each of said ground contact units, and
  said cutting depth adjustment device;
 at least one command device, said at least one command device cooperating with said at least one control device for adjusting said height adjustment device of each of said ground contact units and said cutting depth adjustment device, to obtain said trench having a height difference along the longitudinal direction lower than a predefined tolerance and having a predetermined burial depth;
 wherein said control device compares at least information on the bathymetry with said predefined tolerance and with said predefined burial depth, to generate an expected digging profile;
 wherein said control device cooperates with said command device to adjust at least said cutting depth adjustment device to make a trench having a trench bottom substantially corresponding to said expected digging profile; and
 wherein said control device comprises at least one first data processing unit, for processing information at least on the bathymetry of the bed and at least one second data processing unit, for automatically actuating said command device to adjust said height adjustment device and said cutting depth adjustment device.

2. The underwater trenching assembly according to claim 1, wherein said control device comprises at least one first data processing unit, for processing information at least on the bathymetry of the bed and a control room, for reporting information on the bathymetry of the bed to an operator, and wherein said operator actuates said command device to adjust said height adjustment device and said cutting depth adjustment device.

3. The underwater trenching assembly according to claim 1, wherein said detection device detects, during excavation, a position of at least one portion of said continuous pipeline, and/or wherein said detection device is suitable for detecting during the excavation position of said pipeline portion to be buried; and/or wherein said detection device detects, during the excavation, position of said at least one suspended pipeline portion; and/or wherein said first data processing unit separates information on the bathymetry of the bed from information on positioning of a pipeline portion to be laid.

4. The underwater trenching assembly according to a claim 1, comprising at least one from among:
 a support vehicle, adapted to supply said trench digging device;
 a detection device, for being connected at least to said trench digging device;
 a mechanical arm, for being connected at least mechanically to said main body; and
 wherein at least one from among said support vehicle, said detection device and said mechanical arm comprises said detection device.

5. The underwater trenching assembly according to claim 4, wherein said detection device is a remotely operated submarine or ROV.

6. The underwater trenching assembly according to claim 1, wherein each of said at least four ground contact units is connected to said main body by at least one leg, for driving relative movement between said ground contact unit and said main body; and/or
 wherein each of said at least one leg is connected to a respective ground contact unit by a first mechanical joint, for allowing free rotation between said leg and said respective ground contact unit in a movement plane; and/or
 wherein said first mechanical joint, for allowing the free rotation between said leg and said respective ground contact unit in said movement plane, allows relative movements about an axis orthogonal to said movement plane, or pitch axis, between said leg and said respective ground contact unit; and/or
 wherein said height adjustment device simultaneously and selectively adjusts the position of said ground contact unit with respect to said main body, and the movement about the pitch axis of said ground contact unit independently from the other ground contact units.

7. The underwater trenching assembly according to claim 1, wherein said control device actuates a feedback control on inclination of said main body to actuate said control device to adjust at least said height adjustment device of at least one of said ground contact units, to maintain constant balance conditions, or gradually variable balance conditions, of said trench digging device; and/or
 wherein to maintain the constant balance conditions, or gradually variable balance conditions, a range of variation of the inclination angle of the main body is between 0° and 5° every 10 meters of movement of the trench digging device on the bed; and/or
 wherein said control device performs a feedback loop control on a position of said cutting tool to actuate said command device to adjust said height adjustment device of at least one of said ground contact units and/or said cutting depth adjustment device, to maintain the constant balance conditions, or gradually variable balance conditions of said trench digging device; and/or wherein to maintain the constant balance conditions, or gradually variable balance conditions, the range of variation of the inclination angle of the main body is between 0° and 5° every 10 meters of movement of the trench digging device on the bed.

8. The underwater trenching assembly according to claim 1; wherein said trench digging device comprises said detection device, said control device and said command device to arrange on a single trench digging device the components for automatically controlling and carrying out the digging of a trench having said predetermined burial depth and a height difference along the longitudinal direction less than said predefined tolerance.

9. The underwater trenching device according to claim 1, comprising at least one mechanical arm for connecting at least mechanically to said main body of said trench digging device, wherein said mechanical arm comprises said detection device and is primarily for detecting the bathymetry of bed portions arranged in an advancing direction of the trench digging device.

10. The underwater trenching assembly according to claim 1, wherein said main body of said trench digging device comprises said control device; and/or wherein said main body of said trench digging device comprises said command device.

11. The underwater trenching device according to claim 1, wherein said detection device comprises an acoustic localization device or said detection device comprises a laser.

12. Method for laying a continuous pipeline in an underwater trench dug in a bed, comprising the steps of:
providing a trenching assembly according to claim 1;
detecting bathymetry of the bed;
using bathymetry information to independently adjust the height position of each ground contact unit, and the depth of the excavation of said trench cutting tool, to obtain a trench having an height difference along the longitudinal direction lower than a predefined tolerance;
wherein the at least one control device of said trenching assembly processes at least information on the bathymetry of the bed acquired by the detection device and said predetermined burial depth to generate a predicted digging profile, wherein said at least one control device compares said predicted digging profile with said predefined tolerance to generate said expected digging profile;
laying the continuous pipeline in said trench at a predetermined burial depth.

13. The method according to claim 12, comprising at least one of the following further steps:
setting said predefined tolerance;
setting said predetermined burial depth;
setting the method for measuring the bathymetry of the bed;
detecting the bathymetry of the bed during the excavation of the trench; and/or
processing an excavation profile prediction based on the information on the bathymetry of the bed;
processing an expected profile based on said excavation profile prediction and on said predefined tolerance and on said predetermined burial depth;
obtaining a trench having said trench bottom substantially corresponding to said expected profile;
transmitting information on the bathymetry of the bed to said control device; and/or laying said continuous pipeline on said trench bottom;
burying said continuous pipeline, when laid on said trench bottom, by a certain amount of material;
obtaining a trench having a predetermined burial depth;
obtaining a trench comprising said trench bottom having a height difference along the longitudinal direction less than a predefined tolerance;
wherein said detection device detects the bathymetry of the bed during excavation before said trench cutting tool of said trench digging device is positioned for digging the trench in a bed portion for which the bathymetry has been detected;
wherein said at least one detection device detects during the excavation the bathymetry of bed portions prior to passing of the trench digging device;
wherein said predicted digging profile substantially corresponds to a geometric translation operation by an amount equal to the predetermined burial depth of the profile deriving from the information of the bathymetry of the bed detected in a bed portion for laying the pipeline.

14. An underwater trenching assembly for laying a continuous pipeline in a trench dug in a bed, said continuous pipeline being buried in said trench, said trench extending predominantly along a longitudinal direction; said trenching assembly comprising:
a trench digging device, comprising:
a main body;
at least four ground contact units, wherein each ground contact unit comprises at least one height adjustment device for adjusting at least a position of each ground contact unit with respect to said main body independently from the other ground contact units;
at least one trench cutting tool, for digging in said bed to obtain said trench, wherein said trench cutting tool comprises a cutting depth adjustment device for adjusting the position of said cutting tool with respect to said main body;
at least one detection device, for detecting bathymetry of the bed during the excavation;
at least one control device, for simultaneously allowing cooperation between at least:
said detection device, and
said height adjustment device of each of said ground contact units, and
said cutting depth adjustment device;
at least one command device, said at least one command device cooperating with said at least one control device for adjusting said height adjustment device of each of said ground contact units and said cutting depth adjustment device, to obtain said trench having a height difference along the longitudinal direction lower than a predefined tolerance and having a predetermined burial depth;
wherein said control device compares at least information on the bathymetry with said predefined tolerance and with said predefined burial depth, to generate an expected digging profile;
wherein said control device cooperates with said command device to adjust at least said cutting depth adjustment device to make a trench having a trench bottom substantially corresponding to said expected digging profile; and wherein said control device comprises at least one first data processing unit for processing information at least on the bathymetry of the bed, and at least one second data processing unit, wherein said second data processing unit actuates said command device to automatically adjust the height adjustment device and said cutting depth adjustment device.

15. The underwater trenching assembly according to claim 14, wherein said control device automatically establishes said predefined tolerance based on information related to a type of the pipeline or geophysical parameters of the bed; wherein said first data processing unit and said second data processing unit are a single processing unit; wherein said predefined tolerance is based on settings of an operator; wherein said predefined tolerance is set automatically; wherein said predefined tolerance is substantially 1 meter every 20 meters of trench along the longitudinal direction; and wherein said predetermined burial depth is comprised between 0 meters and 10 meters.

16. The underwater trenching assembly according to claim 15, wherein said predefined tolerance is substantially 0.5 meters every 20 meters of trench.

17. The underwater trenching assembly according to claim 15, wherein said predefined tolerance is substantially 00.1 meters every 20 meters of trench along the longitudinal direction.

18. The underwater trenching assembly according to claim 15, wherein said predefined tolerance is substantially 0.5 meters every 50 meters of trench along the longitudinal direction.

19. The underwater trenching assembly according to claim 15, wherein said predetermined burial depth is comprised between 0 meters and 6 meters.

20. The underwater trenching assembly according to claim 15, wherein said predefined tolerance is substantially 0.1 meters every 50 meters of trench along the longitudinal direction.

* * * * *